(12) United States Patent
Ramasamy et al.

(10) Patent No.: US 11,664,863 B2
(45) Date of Patent: May 30, 2023

(54) METHOD AND APPARATUS FOR WIRELESS CONTROL SYSTEM CONNECTIVITY RESOURCE OPTIMIZATION LEARNING SYSTEM AND USAGE PERSONA

(71) Applicant: Dell Products, LP, Round Rock, TX (US)

(72) Inventors: Suresh K. Ramasamy, Cedar Park, TX (US); Abeye Teshome, Austin, TX (US); Liam B. Quinn, Austin, TX (US); Julius Mueller, Santa Cruz, CA (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 17/502,365

(22) Filed: Oct. 15, 2021

(65) Prior Publication Data
US 2023/0118127 A1    Apr. 20, 2023

(51) Int. Cl.
*H04B 7/06* (2006.01)
*H04B 7/08* (2006.01)

(52) U.S. Cl.
CPC ......... *H04B 7/0602* (2013.01); *H04B 7/0802* (2013.01)

(58) Field of Classification Search
CPC .................. H04B 7/0602; H04B 7/0802

USPC ......................................................... 375/267
See application file for complete search history.

(56) References Cited

U.S. PATENT DOCUMENTS 10,136,395 B1 * 11/2018 Koshy .................. H04W 52/16
2019/0036563 A1 * 1/2019 Koshy .................. H04W 52/18

* cited by examiner

*Primary Examiner* — Leila Malek
(74) *Attorney, Agent, or Firm* — Prol Intellectual Property Law, PLLC; H. Kenneth Prol

(57) ABSTRACT

An information handling system includes a processor; a memory; a PMU; a wireless interface adapter for communicating, via a plurality of transceiving antennas operated by one or more radio frequency (RF) subsystems, wireless links; an antenna controller to receive: a wireless ecosystem persona, a link persona, a system configuration persona, and a usage persona; the antenna controller to execute an antenna selection algorithm to use, as input, the wireless ecosystem persona, the link persona, the system configuration persona, and the usage persona to output a connectivity resource mapping used to assign the plurality of antennas to be communicatively coupled to the one or more peripheral devices and plurality of operating wireless links; and the antenna controller to switch between operating transceiving antennas by accessing RF switches to dynamically change the assignment of the plurality of antennas to the or more peripheral devices and plurality of operating wireless links.

20 Claims, 5 Drawing Sheets

METHOD AND APPARATUS FOR WIRELESS CONTROL SYSTEM CONNECTIVITY RESOURCE OPTIMIZATION LEARNING SYSTEM AND USAGE PERSONA

FIELD OF THE DISCLOSURE

The present disclosure generally relates to transceiving WWAN, and WLAN data streams via a plurality of antennas in an information handling system. The present disclosure more specifically relates to observing, deciding, selecting and switching among a plurality of transceiving antennas via an intelligent wireless control system in an information handling system.

BACKGROUND

As the value and use of information continues to increase, individuals and businesses seek additional ways to process and store information. One option available to clients are information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, WiFi, GPS and Bluetooth signals.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
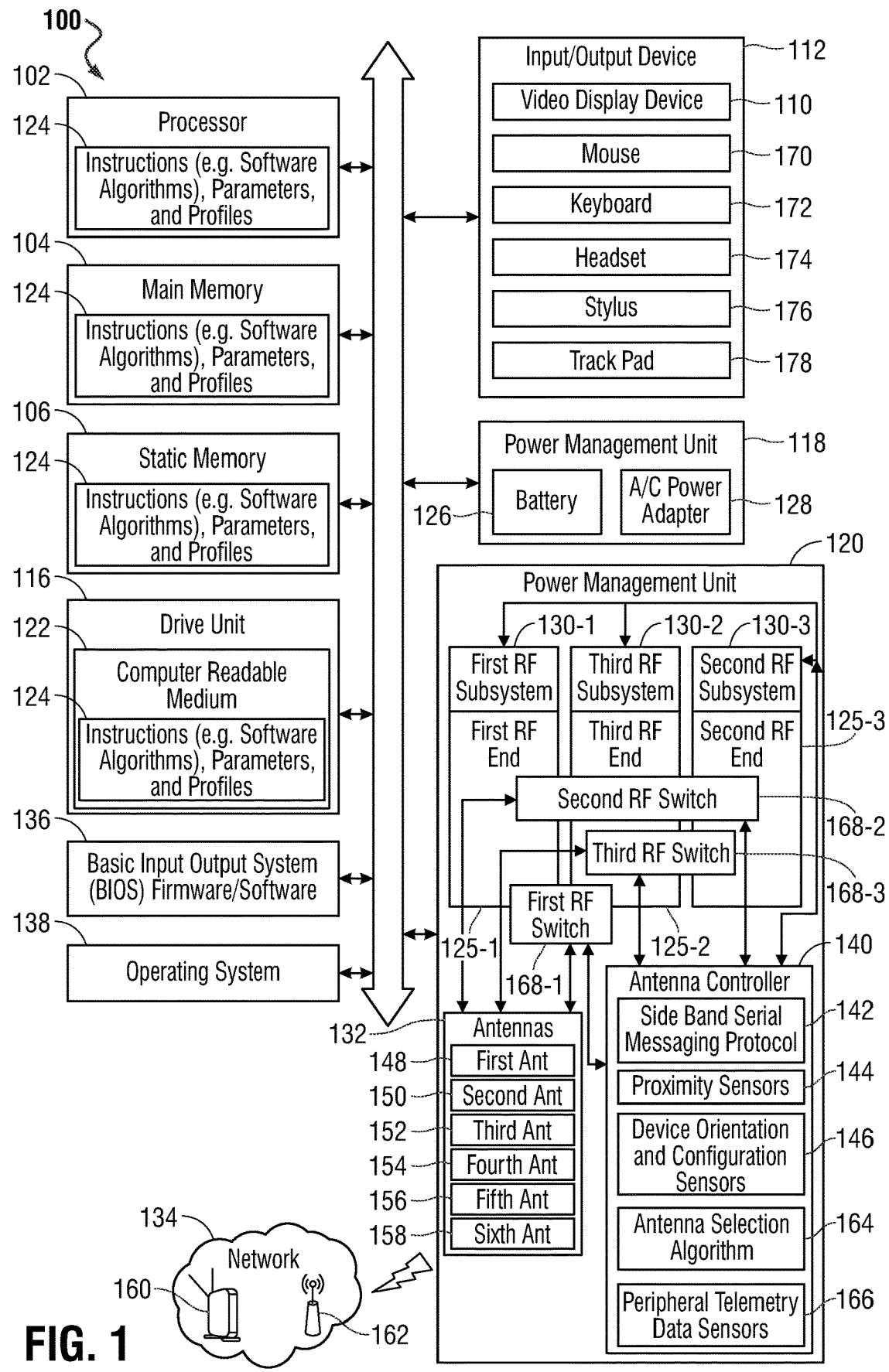
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As mobile computing infrastructure evolves worldwide to enable mobile information handling systems to transmit and receive larger amounts of data more quickly and easily while on the move, the abilities of these mobile information handling systems to receive and transmit various signals simultaneously increase in demand. Information handling systems including those that are mobile in embodiments of the present disclosure address this need by employing a plurality of antenna systems for communication via wireless links operating on a variety of radio access technologies (RAT). For example, a mobile information handling system in an embodiment of the present disclosure may employ separate antenna systems for Wi-Fi signals, wireless wide area network (WWAN) signals, Bluetooth signals, and wireless local area network (WLAN) signals. WWAN signals in embodiments of the present disclosure may include 2G standards such as GSM, 2.5G standards such as GSM EDGE and GPRS, 3G standards such as W-CDMA/UMTS and CDMA 2000, 4G standards such as LTE, LTE-A, LTE-LAA, emerging 5G standards, or WiMAX, small cell WWAN, and the like. Wi-Fi and WLAN signals in embodiments of the present disclosure may include wireless links adhering to standards such as, for example, IEEE 802.11 WiFi, IEEE 802.11ad WiGig, IEEE 802.15 WPAN, and IEEE 802.11ax-2021 (e.g., WiFi 6 and 6E, 6 GHz technologies). In other aspects, several antenna systems may be available for each RAT to enable aggregated data communications such as via plural multiple in, multiple out (MIMO) streams (e.g., Wi-Fi MIMO or cellular MIMO) to enhance data bandwidth or reliability.

Information handling systems also include a number of peripheral devices. Among the number of peripheral devices, one or more may include wireless peripheral devices that communicate with the information handling system wirelessly via an antenna system. For example, a wireless peripheral device may include a wireless mouse. In this example, the wireless mouse may include an antenna such as a Bluetooth antenna that communicates using a Bluetooth protocol or other protocols, for example, a Wi-Fi IEEE 802.11 communication standard. Peripheral devices may operate under yet other wireless protocols and with antennas such as under small cell cellular protocols such as under 5G New Radio protocols as discussed herein. As such, the information handling system may communicate with the wireless mouse or other peripheral devices using one of the antennas within the information handling system whether that antenna is a dedicated antenna used for Bluetooth communications, or a repurposed antenna for use to communicate with the wireless mouse. Similarly, a plurality of other wireless peripheral devices may be used during operation of the information handling system such as a wireless display device, a wireless headset, a wireless virtual reality headset, among others.

In addition to the antennas used to communicate with the wireless peripheral devices, the information handling system may include an antenna to be operatively coupled, wirelessly, to an information handling system management system such as Dell Optimizer®. This remote information handling system management system may operate as a management and operations service provider administrator that is placed between information handling system (e.g., a host device) and a wireless network service provider whether administered and owned by an enterprise or contracted with an outside wireless network provider. This communication may be an out-of-band (OOB) communication established to receive load statistics and network slicing data at the information handling system.

Current configurations involving a plurality of antenna systems operating on a variety of RATs encounter potential problems associated with interference between each of the antennas, compliance with Federal Communications Commission (FCC) standard absorption rate (SAR) requirements across all antennas, a received signal strength indicator (RSSI), base rate over range performance of the plurality of available antennas due to antenna radiation pattern coverage, available of networks to the information handling system to operatively couple to, and incompatibility between radio modems manufactured by different upstream devices, among other system operation and connection metrics. For example, a signal strength (e.g., as a detected RSSI) associated with a WLAN communication access point may be inferior to the signal strength associated with a WWAN communication access point. In another example, operation of one antenna as compared to another antenna within the information handling system may be impeded via a user's body part such that a radio frequency (RF) signal cannot be transmitted or received. Embodiments of the present disclosure address this issue by providing an antenna controller capable of switching from one set and type of antenna device to another based on specific absorption rate (SAR) data from a plurality of SAR sensors, RSSI indicators, system operation and connection metrics including the RSSI data, from the antenna controller executing a sideband serial messaging protocol, and configuration data descriptive of a configuration of the information handling system in order to increase the reliability of signal and transmission and reception of data across any type of network.

Further, current configurations involving a plurality of antenna systems operating on a variety of RATs encounter potential problems associated with dedicated antennas of the various radio frequency (RF) subsystems to support each RAT. The RF subsystems include an oscillator, a radio front end, and other circuitry used to transmit a signal to each antenna. These resources are dedicated and optimized at the host device (e.g., user's information handling system) to operate on those specific RATs. Having dedicated antenna resources to operates under dedicated RATs limits the transception capabilities of the information handling system may also lead to a sub-optimized connectivity for a given technology without consideration of the environment or eco-system the information handling system is operated within. The present specification describes an information handling system that learns about the usage persona of devices in which the information handling system operates in to dynamically change the assignment of the plurality of antennas to be operatively coupled to the or more peripheral devices and plurality of operating wireless links at various RF subsystems thereby creating a connectivity resource mapping. In the present specification and in the appended claims, the term "persona" is to be understood as a state in which an information handling system may operate. For example, a "system configuration persona" describes, at least partially, a detected configuration the information handling system is in. Similarly, "wireless ecosystem persona" describes peripheral telemetry capabilities and/or system operation and connection metrics to one or more networks (e.g., WLAN and WWAN). Additionally, "link persona" may describe the links available to the information handling system for data transmissions such as available Bluetooth, Wi-Fi, and cellular links as well as types of data needs for an information handling system from operating applications. Further, "usage persona" may describe whether any number of sensors have detected the presence of a user near the information handling system (e.g., human proximity) at any given time.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices 112, such as a keyboard 172, a mouse 170, a video/graphic display 110, a stylus 176, a headset 174, and a trackpad 178 or any combination thereof. The information handling system 100 can also include one or more buses 108 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of an antenna selection algorithm 164, and drive unit 116 (volatile (e.g., random-access memory, etc.), nonvolatile (read-only memory, flash memory etc.) or any combination thereof).

As shown, the information handling system 100 may further include a video display device 110. The video display device 110 in an embodiment may function as a liquid crystal display (LCD), an organic light emitting diode (OLED), a flat panel display, or a solid-state display. Additionally, the information handling system 100 may include an alpha numeric input device such as a keyboard 172 and/or a cursor control device, such as a mouse 170, touchpad/trackpad 178, or gesture or touch screen input device. The information handling system 100 can also include a disk drive unit 116.

The network interface device shown as wireless interface adapter 120 can provide connectivity to a network 134, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point or base station used to operatively coupled the information handling system 100 to a network. In a specific embodiment, the network 134 may include macro-cellular connections via one or more base stations 162 or a wireless access point 160 (e.g., Wi-Fi or WiGig), or such as through licensed or unlicensed WWAN small cell base stations. Connectivity may be via wired or wireless connection. Wireless interface adapter 120 may include one or more radio frequency (RF) subsystems 130-1, 130-2, 130-3 with transmitter/receiver circuitry, modem circuitry, one or more antenna front end 125-1, 125-2, 125-3 circuits, one or more wireless controller circuits, amplifiers, antennas 132 and other circuitry of the RF subsystems 130-1, 130-2, 130-3 such as one or more antenna ports used for wireless communications via multiple radio access technologies (RATs). Each of the RF subsystems 130-1, 130-2, 130-3 may communicate with one or more wireless technology protocols. The RF subsystems 130-1, 130-2, 130-3 may contain individual subscriber identity module (SIM) profiles for each technology service provider and their available protocols for any operating subscriber-based radio access technologies such as cellular LTE communications.

In an embodiment, the wireless interface adapter 120 may provide connectivity to a one or more of the peripheral devices that may include a wireless video display device 110, a wireless keyboard 172, a wireless mouse 170, a wireless headset 174 such as a virtual reality headset and/or a microphone and speaker headset, a wireless stylus 176, and a wireless trackpad 178 among other wireless peripheral devices used as input/output (I/O) devices 112. Each of these wireless peripheral devices may include a wireless radio and an antenna to wirelessly couple the one or more peripheral devices to the information handling system 100. Wireless peripheral devices may operate with Bluetooth radio protocols in an embodiment. In other embodiments, wireless peripheral devices may operate with Wi-Fi 802.11 radio protocol, 5G NR radio protocols, or other wireless protocols. As described herein, an antenna controller 140 may execute an antenna selection algorithm 164 in order to provision one or more of a plurality of antennas for use with the wireless coupling of these wireless peripheral devices to the information handling system 100.

The wireless interface adapter 120, also known as a wireless interface device, may also include antennas 132 which may include any number of tunable antennas for use with the system and methods disclosed herein. In the embodiment shown in FIG. 1, the antennas 132 may include a first antenna 148, a second antenna 150, a third antenna 152, a fourth antenna 154, a fifth antenna 156, and a sixth antenna 158. However, the present specification contemplates that the antennas 132 may include more or less of the number of individual antennas 148, 150, 152, 154, 156, 158 shown in FIG. 1. Additional antenna system modification circuitry (not shown) may also be included with the wireless interface adapter 120 to implement coexistence control measures via an antenna controller 140 as described in various embodiments of the present disclosure.

In some aspects of the present disclosure, the wireless interface adapter 120 may operate two or more wireless links. In a further aspect, the wireless interface adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 2.4 GHz/2.5 GHz or 5 GHz wireless communication frequency bands may be apportioned under the 5G standards for communication on either small cell WWAN wireless link operation or Wi-Fi WLAN operation. In some embodiments, the shared, wireless communication band may be transmitted through one or a plurality of antennas or antennas may be capable of operating at a variety of frequency bands. In a specific embodiment described herein, the shared, wireless communication band may be transmitted through a plurality of antennas used to operate in an N×N MIMO array configuration where multiple antennas 148, 150, 152, 154, 156, 158 are used to exploit multipath propagation which may be any variable N. For example, N may equal 2, 3, or 4 to be 2×2, 3×3, or 4×4 MIMO operation in some embodiments. Other communication frequency bands, channels, and transception arrangements are contemplated for use with the embodiments of the present disclosure as well and the present specification contemplates the use of a variety of communication frequency bands.

In other aspects, the information handling system 100 operating as a mobile information handling system may operate a plurality of wireless interface adapters 120 for concurrent radio operation in one or more wireless communication bands. The plurality of wireless interface adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The radio transmission or reception operates under the wireless interface adapter 120 which is made to execute an antenna selection algorithm and potentially make antenna system adjustments according to present disclosure. In an embodiment, any of the antennas 148, 150, 152, 154, 156, 158 may operate as dual band antennas that transceive at 2.4 GHz and 5 GHz, 2.4 GHz and 6 GHz, or 5 GHz and 6 GHz for example. Additionally, the dual band antennas may transceive at concurrent dual-band modes allowing transception to occur via at least two different frequencies such as 2.4 GHz and 5 GHz to communicate with a network and a peripheral device.

The wireless interface adapter 120 may operate in accordance with any wireless data communication standards. To communicate with a wireless local area network, standards including IEEE 802.11 WLAN standards (e.g., IEEE 802.11ax-2021 (Wi-Fi 6E, 6 GHz)), IEEE 802.15 WPAN standards, WWAN such as 3GPP or 3GPP2, Bluetooth standards, or similar wireless standards may be used. Wireless interface adapter 120 may connect to any combination of macro-cellular wireless connections including 2G, 2.5G, 3G, 4G, 5G or the like from one or more service providers. Utilization of radio frequency communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, mobile information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, a WWAN RF front end (e.g., antenna front end 125-1, 125-2, or 125-3 circuits) of the information handling system 100 may operate on a licensed WWAN wireless radio with authorization for subscriber access to a wireless service provider on a carrier licensed frequency band.

The wireless interface adapter 120 can represent an add-in card, wireless network interface module that is integrated with a main board of the information handling system or integrated with another wireless network interface capability, or any combination thereof. In an embodiment the wireless interface adapter 120 may include one or more radio frequency subsystems 130 including transmitters and wireless controllers for connecting via a multitude of wireless links. In an example embodiment, an information handling system 100 may have an antenna system transmitter for 5G small cell WWAN, Wi-Fi WLAN or WiGig connectivity and one or more additional antenna system transmitters for macro-cellular communication. The RF subsystems 130-1, 130-2, 130-3 include wireless controllers to manage authentication, connectivity, communications, power levels for transmission, buffering, error correction, baseband processing, and other functions of the wireless interface adapter 120.

The information handling system 100 may also, via the RF subsystems 130-1, 130-2, 130-3 of the wireless interface adapters 120, measure various metrics such as system operation and connection metrics that relate to wireless communication by the information handling system 100 and provide that data as input data for an antenna selection algorithm 164 as described in the present disclosure. For example, the antenna controller 140 and RF subsystems 130-1, 130-2, 130-3 may manage detecting and measuring received signal strength levels, bit error rates (BER), signal to noise ratios, latencies, jitter, application telemetry data, specific absorption rate (SAR) data, and other metrics relating to signal quality and strength of any of a plurality of communication networks made available to the information handling system 100. Some metrics relating to signal quality and strength of a wireless connection to a communication network may include a received signal strength indicator (RSSI). Additionally, the antenna controller 140 and radio frequency subsystem 130 may manage detecting which communication networks are available to the information handling system 100 to be operatively coupled to. In an embodiment, the detecting of communication networks available to the information handling system 100 may be accomplished using an out-of-band (OOB) communication to each of these networks. The antenna controller 140 may operate a sideband communication to each of the RF subsystems 130-1, 130-2, 130-3 to discover any potential network status and telemetry data from those radio systems. In another example embodiment, the information handling system 100 may communicate with a backend server or other server via this sideband communication establishing an OOB communication on at least one network (e.g., Wi-Fi) to obtain this data from one of an information handling system management system such as Dell Optimizer® for enterprise-administered wireless networks or a third-party service provider organization contracted to provide additional network-based data. For example, OOB communication with an information handling system management system may also discover telemetry data on one or more radio access networks for network data such as bandwidth, data congestion, channel availability, number of devices accessing access points or basestations, among others, as well as any other data related to the potential communication of the information handling system 100 with these radio access networks. Again, this remote information handling system management system may operate as a management and operations service provider administrator that is placed between information handling system (e.g., a host device) and a wireless network service provider that is the enterprise-owner of the wireless networks or third-party subscriber or available wireless networks.

During operation, the antenna controller 140 may also request and receive configuration data from, for example, an integrated sensor hub or individual device orientation and configuration sensors 146, that describes the configuration and/or orientation of the information handling system 100. In an example embodiment and in the context of the information handling system 100 being a 360-degree-type laptop, any number of sensors may be used to determine if the orientation the information handling system 100 is placed in is one of a tablet configuration, a dual tablet configuration, a laptop configuration, a tent mode configuration, a book configuration, as well as several other configurations described herein. The variety of sensors used to determine the configuration and/or orientation of the information handling system 100 may include, for example, a Hall effect sensor, a magnetometer, a proximity sensor, a hinge sensor, a light sensor, and a camera, among other sensors. In an embodiment, these variety of sensors may also include an accelerometer, a gyroscope, an orientation sensor in addition to these other sensors. In the embodiment, where an orientation sensor is used, a plurality of orientation sensors may be used to reference direction such as "up" or "north" in order to determine the orientation of the information handling system 100. In an embodiment, this configuration data may form at least a part of the system configuration persona.

In an embodiment, the information handling system 100 may also gather peripheral telemetry data from an RF subsystem 130-1, 130-2, 130-3 operatively coupling one or more peripheral devices to the information handling system. In an embodiment, the RF subsystems 130-1, 130-2, 130-3 may be operatively coupled to peripheral telemetry data sensors 166 that describe which and what type of peripheral devices are operatively coupled to or couplable to the information handling system 100. In an embodiment, the peripheral telemetry data is also descriptive of the connectivity requirements for the one or more peripheral devices such as which wireless communication protocol the peripheral device may communicate with the information handling system 100. As described herein, the peripheral devices may include any one of the keyboard 172, mouse 170, video/graphic display 110, stylus 176, headset 174, trackpad 178 among other peripheral devices that may be wirelessly couplable to the information handling system 100. In an embodiment, this wireless peripheral status and telemetry data may form at least a part of the wireless ecosystem persona.

In an embodiment, the antenna controller 140 of the wireless interface adapter 120 may manage one or more RF subsystems 130-1, 130-2, 130-3 to manage transmission power levels which directly affect RF subsystems 130-1, 130-2, 130-3 power consumption as well as transmission power levels from the plurality of antennas 148, 150, 152, 154, 156, 158. The transmission power levels from the antennas 148, 150, 152, 154, 156, 158 may be relevant to specific absorption rate (SAR) safety limitations for transmitting mobile information handling systems. To control and measure power consumption by the antennas 148, 150, 152, 154, 156, 158, the RF subsystems 130-1, 130-2, 130-3 may control and measure current and voltage power that is directed to operate one or more antennas 148, 150, 152, 154, 156, 158. Additional SAR data may be received via operation of a number of proximity sensors 144 located at or near each of the antennas 148, 150, 152, 154, 156, 158 which may include SAR sensors. In this embodiment, the power levels provided to the antennas 148, 150, 152, 154, 156, 158 may be compared to the data received by the proximity sensors 144 to determine, for example, these SAR safety limitations as well as determine whether, for example, a user's body part is absorbing this RF electromagnetic radiation. In an embodiment, this SAR data may form at least a part of the usage persona. This data associated with the usage persona may be provided to the antenna controller 140 executing the antenna selection algorithm 164 to determine the assignment of the plurality of antennas 148, 150, 152, 154, 156, 158 to the or more peripheral devices and plurality of operating wireless links initiated by the RF subsystems 130-1, 130-2, 130-3.

In an embodiment, the antenna controller 140 may also include device orientation and configuration sensors 146. The device orientation and configuration sensors 146 may, upon execution by the processor 102, receive input from any number of sensors and organize the data from that input in order to track the orientation, configuration, and/or location of the information handling system 100. These sensors may include, for example, a temperature sensor, a pressure sensor, a Hall effect sensor, a magnetic sensor, an accelerometer, a magnetometer, a hinge sensor, a light sensor (e.g., ultraviolet light sensor, ambient light sensor), a camera, and a color sensor, among others. Each of these sensors may provide data to an integrated sensor hub which provides that data to the antenna controller 140 to be used as input to the antenna selection algorithm 164. In an embodiment, this data related to the orientation, configuration, and/or location of the information handling system 100 forms part of the system configuration persona. In an embodiment, these sensors may be actively operating in order to describe the orientation, configuration, and location of the information handling system 100 at any given time and update the system configuration persona periodically.

The antenna controller 140 may also include a sideband serial messaging protocol 142 that, when executed by the antenna controller 140, initiates the sideband communication with any of the RF subsystems 130-1, 130-2, 130-3 to establish an out-of-band (OOB) communication with at least one of the plurality of networks described herein. In an embodiment, the sideband communication may be initiated to establish any OOB wireless communication link with any wireless network apart from a concurrently initiated communication link. In an embodiment, the sideband communication link achieved via execution of the sideband serial messaging protocol 142 may allow the antenna controller 140 to determine which wireless networks are available to operatively couple the information handling system 100 to a wireless network as well as any system operation and connection metrics associated with those wireless networks. Again, because the system operation and connection metrics include wireless quality of service (QoS) data descriptive of a measured received signal strength level (RSSI), bit error rate (BER), signal to noise ratio (SNR), network beacon and enclosed information, latency, jitter, and other metrics relating to signal quality and strength of any of each of a plurality of communication networks, the data obtained by the antenna controller 140 may be used during execution of the antenna selection algorithm 164 to determine which wireless network to operatively couple the information handling system to. In an embodiment, this link status data and telemetry data may form at least a part of the link persona detected for the information handling system.

The information handling system 100 may further include a power management unit (PMU) 118 (a.k.a. a power supply unit (PSU)). The PMU 118 may manage the power provided to the components of the information handling system 100 such as the processor 102, a cooling system, one or more drive units 116, a graphical processing unit (GPU), a video/graphic display device or other input/output devices 112, and other components that may require power when a power button has been actuated by a user. In an embodiment, the PMU 118 may monitor power levels and be electrically coupled to the information handling system 100 to provide this power and coupled to bus 108 to provide or receive data or instructions. The PMU 118 may regulate power from a power source such as a battery 126 or A/C power adapter 128. In an embodiment, the battery 126 may be charged via the A/C power adapter 128 and provide power to the components of the information handling system 100 when A/C power from the A/C power adapter 128 is removed.

Information handling system 100 includes one or more of an operating system (OS) 138, and basic input/output system (BIOS) firmware/software 136 or application programs that may be executable instructions 124 executed at any processor 102 and stored at one or more memory devices 104, 106, or 116. BIOS firmware/software 136 functions to initialize information handling system 100 on power up, to launch an OS 138, and to manage input and output interactions between the OS 138 and the other elements of information handling system 100. In a particular embodiment, BIOS firmware/software 136 resides in memory 104, and include machine-executable code that is executed by processor 102 to perform various functions of information handling system 100 as described herein. In another embodiment (not illustrated), application programs and BIOS firmware/software 136 reside in another storage medium of information handling system 100. For example, application programs and BIOS firmware/software 136 can reside in drive 116, in a ROM (not illustrated) associated with information handling system 100, in an option-ROM (not illustrated) associated with various devices of information handling system 100, in a storage system (not illustrated) associated with network channel of a wireless interface adapter 120, in another storage medium of information handling system 100, or a combination thereof. Executable code instructions 124 for application programs and BIOS firmware/software 136 can each be implemented as single programs, or as separate programs carrying out the various features as described herein.

During operation of the information handling system 100, the processor 102 may cause the antenna controller 140, via the RF subsystems 130-1, 130-2, 130-3, to initiate a sideband communication link by executing the sideband serial messaging protocol 142. In this embodiment, the sideband serial messaging protocol 142 may include any instructions executable by an embedded controller (EC), the processor 102, or a combination thereof to establish an OOB communication link with a network to identify any potential communication link available to the information handling system 100 that operatively couples the information handling system 100 to any type of network described herein. In an embodiment, the antenna controller 140 may execute the sideband serial messaging protocol 140 to operatively couple the information handling system 100 to a Wi-Fi access point for OOB communications in order to harvest operating band data, channel data, along with other system operation and connection metrics associated with that Wi-Fi network and other available RAT networks from the information handling system management system such as Dell Optimizer® operating as a management and operations service provider administrator placed between the information handling system 100 and a wireless network service provider such as for an enterprise owned or third party provided wireless network. Additionally, or alternatively, the antenna controller 140 may execute the sideband serial messaging protocol 140 to operatively couple the information handling system 100 to another WLAN or WWAN access point such as the wireless access point 160 or base stations 162 within any network as described herein to establish these OOB communications in some other embodiments. In these embodiments, by operatively coupling the information handling system 100 to these wireless access points 160 and base stations 162, the information handling system 100 may harvest system operation and connection metrics via OOB communications that define a link persona. This may be done for plural, available RAT networks and may be received by the information handling system from the information handling system management system such as Dell Optimizer®. Examples of these system operation and connection metrics used to define the link persona of the information handling system may include frequencies of the communication bands, bands used, channels used, concurrent WWAN and WLAN channels or other protocol channels, non-concurrent WWAN and WLAN channels or other protocol channels, idle metrics, disconnected states, signal strength metrics, and identification of radio access technology used to communicate with the network, networks may include those such as 4G, licensed-assisted access (LAA), 5G, Wi-Fi6, Wi-Fi6e, and may implement wire links utilizing Wi-Fi dual-band simultaneous (DBS) operation, uplink or downlink MIMO (e.g., 4×4 Wi-Fi MIMO or 4×4 cellular MIMO), a number of spatial streams, among other wireless link types for which metrics and operating characteristics may be measured. In this way, the antenna controller 140 may help to determine which wireless protocol (e.g., Bluetooth, Wi-Fi, other WLAN, or WWAN) is actively operating by the information handling system 100 along with what wireless protocols of the available wireless networks are available for the information handling system 100. In an embodiment, these system operation and connection metrics defining the link persona may also include the wireless QoS data. As described herein, this data associated with the link persona of the information handling system may form part of the input the antenna controller 140 is provided during the execution of the antenna selection algorithm 164 described herein. The antenna controller 140 may then, based at least partially on this data associated with the link persona and other data described herein, switch an RF switch 168-1, 168-2, 168-3 associated with the antenna front end 125-1, 125-2, 125-3 circuits to engage an antenna element with an RF subsystem 130-1, 130-2, 130-3 operating a wireless protocol that increases data transmissions based on the system operation and connection metrics defined within the link persona. This may manage resources at the information handling system 100 using the on-board wireless resources in order to optimize the operation of the information handling system 100 operating within a wireless connectivity context while maintaining OOB communication used to dynamically distribute and optimize those resources should changes in, at least, that link persona be identified.

For example, output is provided by the execution of the antenna selection algorithm, a wireless connectivity context may be created. This wireless connectivity context may define which of the antennas 132 are to be operatively coupled to which RF subsystem 130-1, 30-2, 130-3 in order to optimize those antenna resources. This wireless connectivity context may have identified that Wi-Fi is not always be available for a mobile information handling system such as a laptop. If Wi-Fi is not available, an antenna controller 140 is directed, per the wireless connectivity context, to execute an RF switch 168-1, 168-2, 168-3 to enable one or more antenna elements to operate with a cellular wireless subsystem in an embodiment to enhance data bandwidth and wireless coverage as well as be operatively coupled to a Bluetooth device, in some embodiments, concurrently. For example, four antenna elements may be available to the cellular subsystem and provide for 4×4 MIMO connectivity. In this embodiment, at least one of the antenna elements may operate in a concurrent mode by communicating with a Bluetooth device using, for example a 2.4 GHz frequency band, as well as with a cellular network (or a WLAN network) using a 5 GHz frequency band. This allows the information handling system 100 to accommodate for, at least, the link persona the information handling system 100 is operating under and, along with a wireless ecosystem persona, a usage persona, and a system configuration persona, provide communications to one or more wireless network as well as with one or more peripheral devices used to allow the user to provide input to and receive output from the information handling system 100.

In another embodiment, if Wi-Fi is detected as available or operational, the antenna controller may allocate one or more shared antennas via an RF switch 168-1, 168-2, 168-3 to the Wi-Fi wireless subsystem to enable Wi-Fi communications (e.g., 2×2 MIMO Wi-Fi communications). Remaining antennas may still provide for some portion of a cellular wireless subsystem communication (e.g., 2×2 MIMO cellular communications). The antenna elements (e.g., antennas 148, 150, 152, 154, 156, 158) may then effectively transmit communications signals depending on the wireless conditions detected and described in the link persona.

In an embodiment, the system operation and connection metrics that are defined in, at least, the link persona and wireless ecosystem persona, such as for coupled wireless peripherals, may be obtained by the antenna controller 140 via execution of a sideband serial messaging protocol 140 to the RF subsystems 130-1, 130-2, 130-3. This system and operation and connection metrics described in the link persona and wireless ecosystem persona may be used as input to the antenna selection algorithm 164 along with the system configuration persona and usage persona. As input, these system operation and connection metrics may help to determine which of a plurality of antennas 148, 150, 152, 154, 156, 158 to use in order to be used to operate the RF subsystems 130-1, 130-2, 130-3 at an optimizable wireless protocol to accommodate the detected personas of the information handling system 100 wireless connectivity context detected.

In addition to retrieving the system operation and connection metrics defined in the link persona, the antenna controller 140 may also obtain any proximity data (e.g., presence of humans or any detected SAR data) from a plurality of proximity sensors 144. The proximity data obtained may form part of the usage persona described herein. In an embodiment, the retrieval of this proximity data may be done concurrently along with the retrieval of the other system operation and connection metrics described herein such as the link persona, the wireless ecosystem persona, and the system configuration persona. The proximity data is gathered using, in an embodiment, a SAR proximity sensor 144 associated with each antenna 148, 150, 152, 154, 156, 158 formed within the information handling system 100. Additionally, the transmission power levels (e.g., current and voltage) from the antennas 132 may be relevant to specific absorption rate (SAR) safety limitations for transmitting mobile information handling systems and may be used to develop the SAR data provided to the antenna controller 140. This SAR data may also be used by the antenna controller 140 executing the antenna selection algorithm 164 as input to the antenna selection algorithm 164 in order to help determine which of a plurality of antennas 148, 150, 152, 154, 156, 158 to use in order to operate the information handling system 100 under a wireless protocol for the detected information handling system 100 wireless connectivity context.

In addition to retrieving the proximity data, the antenna controller 140 may also obtain any RSSI data or other wireless signal quality metrics used to form part of the usage persona. In one embodiment, RSSI data may be retrieved from, for example, an intermediate-frequency (IF) amplifier used by the wireless interface adapter 120 to raise or lower signal levels at the RF subsystems 130-1, 130-2, 130-3 by increasing or decreasing the power applied to each of the antennas 148, 150, 152, 154, 156, 158. If and when the RSSI drops, for example, the proximity data may also be cross-referenced to determine whether the drop in transmission is due to the presence of a human body or a drop in power otherwise provided to or received by any given antenna 148, 150, 152, 154, 156, 158. This RSSI data or other wireless signal quality metrics may form part of the usage persona as described herein.

In an embodiment, the antenna controller 140 may also obtain configuration data descriptive of a configuration of the information handling system 100. In an embodiment, this configuration data may form part of the system configuration persona as described herein. In order to do this, the information handling system 100 may include a number of additional sensors include, for example, a Hall effect sensor. The Hall effect sensor may be placed at any location within the chassis of the information handling system 100 to detect the position of the individual parts of the information handling system 100 relative to each other. In a specific embodiment where the information handling system 100 is a laptop-type information handling system 100, the Hall effect sensor may be placed in one or more of a display portion or base portions of the information handling system 100. In this embodiment, the Hall effect sensor, in combination with any orientation sensor, gyroscope, and/or accelerometer, may detect when the display portion is moved away from a top surface of a based portion, a relative position of the display portion to the base portion, and/or when a back side of the display portion is placed against a bottom portion of the base portion of the information handling system 100. As described herein, this allows the Hall effect sensor and other sensors to detect whether the laptop-type information handling system 100 is placed in an open configuration, a closed configuration, a tablet configuration, a dual tablet configuration, a laptop configuration, a tent mode configuration, a book configuration, as well as several other configurations described herein. The Hall effect sensor and other sensors may be similarly used in a dual screen-type information handling system 100 in order to detect the relative positions of each of the screens. Again, any data obtained by the Hall effect sensor and other sensors is presented to the antenna controller 140 for the antenna controller 140 to interpret and provide that orientation data as input to the antenna selection algorithm 164 as described herein.

In an embodiment, a magnetometer may operate as an orientation sensor and may be used to measure the earth's magnetic field at any location in order to detect an orientation of the information handling system 100 relative to that magnetic field in order to further define the system persona. In a specific embodiment, the magnetometer may be a three-axis magnetometer that eliminates the sensitivity to the way in which the information handling system 100 is held or positioned. Similarly, a gyroscope sensor may be used to measure any changes in direction along an x-axis, a y-axis, and a z-axis according to a Cartesian coordinate system. Again, any data obtained by the magnetometer is presented to the antenna controller 140 for the antenna controller 140 to interpret and provide as input to the antenna selection algorithm 164 as described herein.

When the peripheral telemetry data, system operation and connection metrics, and configuration data are received by the antenna controller 140, the antenna controller 140 may execute the antenna selection algorithm 164 in order to identify which among a plurality of transceiving antennas 148, 150, 152, 154, 156, 158 are to be associated with any given RF subsystem 130-1, 130-2, 130-3 in order to communicate with a network using one or more determined wireless protocols. As such, the information handling system 100 may periodically monitor for changes in the peripheral telemetry data, system operation and connection metrics, and configuration data in order to determine if and when to switch any number of antennas 148, 150, 152, 154, 156, 158 form being operatively coupled to an initial RF subsystem 130-1, 130-2, 130-3 to a different RF subsystem 130-1, 130-2, 130-3 for the information handling system 100 to transceive data across any type of network to accommodate the above persona for the information handling system 100 connectivity context for the antenna selection algorithm.

In an embodiment, the antenna selection algorithm 164 may include an artificial neural network, Bayesian network, decision trees, regression analysis, among other machine learning service algorithms that may be used to model the persona within which the information handling system 100 operates and provide a closed loop system that can dynamically distribute and optimize resources (e.g., RF subsystems 130-1, 130-2, 130-3 and antennas 148, 150, 152, 154, 156, 158) by providing feedback or output that optimizes the connectivity of the information handling system 100 to the various wireless networks based on the detected data of the usage persona, the system configuration persona, the wireless ecosystem persona, the link persona, and other aspects of the information handling system 100 wireless connectivity context for antenna control. In this embodiment, the antenna selection algorithm 164 applies a machine learning methodology to determine correlations of the influencing factors including peripheral telemetry data, system operation and connection metrics, configuration data, operating software applications, and other metrics from personas in embodiments described herein and detect changes to any of these influencing factors to suggest or automatically apply changes to the assignment of any of the antennas 148, 150, 152, 154, 156, 158 to any of the RF subsystems 130-1, 130-2, 130-3. In some aspects, suggested predictive adjustments or notice of automatic predictive adjustments may be confirmed or declined by the user. In an embodiment, the antenna selection algorithm 164 is executed on a processor 102. Additionally, or alternatively, the antenna selection algorithm 164 is executed remotely on an information handling system management system such as Dell Optimizer® and antenna control may be provided remotely to the information handling system 100 via an OOB communication or on other processing logic (e.g., an embedded controller) in whole or in part available at or accessible to the information handling system 100. In an embodiment, the suggested adjustments may be provided to the antenna controller 140. Based on these selected adjustments, the antenna controller 140 may send signals to the RF switches 168-1, 168-2, 168-3 to cause the suggested assignments of the antennas 148, 150, 152, 154, 156, 158 to the suggested RF subsystems 130-1, 130-2, 130-3 in order to increase the optimized use of the transceiving antennas 148, 150, 152, 154, 156, 158 while the information handling system 100 operates within the detected persona.

In an embodiment, the antenna selection algorithm 164 may include a look-up table. This look-up table may include a number of triggers that may be used to define the peripheral telemetry data, the system operation and connection metrics, and configuration data defined by the usage persona, the system persona, the wireless ecosystem persona, the link persona, and other aspects of the information handling system 100 wireless connectivity context for antenna control. The look-up table may also include a connectivity resource mapping defining an antenna assignment as output based on the peripheral telemetry data, the system operation and connection metrics, and configuration data as described. This output may be referred to herein as a wireless connectivity context. The look up table includes, as inputs, the usage persona, the system persona, the wireless ecosystem persona, the link persona, and other aspects of the information handling system 100 wireless connectivity context. These inputs may be treated as data points that are correlated with a wireless connectivity context of the information handling system 100 at that point in time. The output of the look-up table includes the correlation of this context into an assignment and operative coupling of the various antennas 132 to specific RF subsystems 130-1, 130-2, 130-3 and the operating frequencies of each of those antennas 132. Multiple sets out of outputs defining the wireless connectivity contexts may be presented in the table as "scenarios." Where the antenna selection algorithm 164 is a machine learning service algorithm, these inputs may be used to correlate the various inputs and provide, as output to dynamically distribute and optimize resources (e.g., RF subsystems 130-1, 130-2, 130-3 and antennas 148, 150, 152, 154, 156, 158, FIG. 1) by providing feedback or output that optimizes the connectivity of the information handling system to the various wireless networks and peripheral devices (e.g., Bluetooth devices). In an embodiment, both the machine learning service algorithm and look-up table may be used with different scenarios being added to the look-up table based on the classifier of the machine learning algorithm adjusting the table based on its past output performance feedback.

In an embodiment, where the information handling includes six antennas, such a look-up table may look like the following table (Table 1):

TABLE 1

| | System and Usage Persona | | | Connectivity Resource Mapping | | | | | | | | |
|---|---|---|---|---|---|---|---|---|---|---|---|---|
| | System | | Wireless | | | | | | | | | |
| Scenario | Config. Persona | Usage Persona | Ecosystem Persona | Link Persona | Host WWAN Radio | | | | Host Wi-Fi Radio | | Host BT Radio | OOB Wi-Fi Radio |
| 1 | Lid open | No human proximity | Wi-Fi headset and BT Mouse present | Host Wi-Fi VHT, CDB Mode | Ant #1 Main Scan (Scanning for cellular network) | Ant #2 MIMO1 not connect | Ant #3 MIMO2 Connect to Host Wi-Fi (5 GHz) | Ant #4 MIMO3 Connect to Host Wi-Fi (5 GHz) | Ant #5 Connect (5 GHz) Concurrent mode (CDB) with Host BT radio | Ant #6 Connected 2.4 GHz Connect to Headset | Ant #5 2.4 GHz Connect to Mouse | Ant #2 WWAN MIMO1 Scanning for OOB provisioning |
| 2 | Tablet | Human proximity near Antennas 3, 4, and 5 | No peripheral connected | Host Wi-Fi VHT, CDB Mode 4 × 4 LTE | Ant#1 Main Connected | Ant #2 MIMO1 Connect | Ant #3 MIMO2 Not Connect | Ant #4 MIMO3 Connect to Wi-Fi (5 GHz) | Ant #5 Connect (5 GHz) | Ant #6 Connect (5 GHz) | Not connected | Ant #3 WWAN MIMO2 Scan |

Although, Table 1 shows two scenarios, also referred to as wireless connectivity contexts that may be determined for detected persona inputs according to embodiments herein, it is appreciated that more than two scenarios may be presented or maintained on such a look-up table. As such, it is appreciated that more rows may be added to Table 1 as additional and different inputs (e.g., usage persona, system configuration persona, wireless ecosystem persona, the link persona, and other aspects of the information handling system 100 wireless connectivity context for antenna control) are presented to the antenna selection algorithm 164 and used to determine how to assign the antennas 132 to the RF subsystems 130-1, 130-2, 130-3.

In this example look-up table, two scenarios are presented. However, these scenarios are meant to be only two examples of several potential embodiments describing a persona under which the information handling system 100 may operate and is not meant to limit the present disclosure to these specific scenarios. In scenario #1 (third row, Table 1), system and usage persona data include a first column that describes system configuration persona data descriptive of, at least, some of the data associated with the configuration data described herein. In scenario #1, this system configuration persona data includes an indication that the lid of the information handling system 100 is open indicating its configuration. In this context, the information handling system 100 is a laptop-type information handling system with the lid or a part of the chassis that includes a video display device 110 in an open state relative to a base chassis. As described, this specific orientation data of the system configuration data may be detected using any number of sensors including a Hall effect sensor as described herein. In embodiments herein, when the lid or display chassis is in an open state on a laptop-type information handling system for example, the user can view the display while interacting with the keyboard placed within the base chassis. When the lid or display is in a closed state on a laptop-type information handling system, the display is not viewable due to the display chassis being closed against the base chassis. It is appreciated that in the closed position, the user may still interact with operation of the information handling system when, for example, the information handling system 100 is docked at a docking station and an external monitor is used as an I/O device. Further, in other embodiments, the information handling system 100 may operate in a closed orientation to conduct various wireless activity such as background functions, OOB communications, or Bluetooth/Wi-Fi/5G communications with other peripherals such as virtual reality headsets or the like. It is further appreciated that other configurations of the information handling system 100 apart from a closed and open position are anticipated in the present specification. As described, these other configurations include tablet configuration where the information handling system is in a tablet form or where the base portion of the information handling system is made to flip behind the display portion. In a dual tablet configuration, the information handling system 100 may be made of a base portion that includes a separate base chassis display device along with the display device of the display portion of the information handling system or a single foldable display may span both chassis of a dual-display information handling system 100. In this dual tablet configuration, the base portion and display portion are laid open to reveal both display devices or an entire foldable display to the user. In a laptop configuration, the information handling system may have the base portion on a table or on the user's lap with the display portion upright and viewable to the user. In a tent mode configuration, the display portion may be viewable to the user with the base portion in an orientation to prop up the display portion on a table, for example. In a book configuration, the base portion and display portion of the information handling system may be opened up to the user and the system rotated like the user has a book open. Several other configurations described herein may also be used. It is appreciated that these individual configurations may affect the transmission and reception capabilities of any of the antennas 148, 150, 152, 154, 156, 158 within the information handling system 100 due to their placement within the chassis of the information handling system 100. For example, where some of the antennas 148, 150, 152, 154, 156, 158 are placed in the base portion of a laptop-type information handling system 100, placing the laptop on a user's lap may affect the ability of those antennas 148, 150, 152, 154, 156, 158 to transmit or receive data. This may be evidenced by the resulting SAR data or RSSI data as indicated in the second column of Table 1.

Scenario #1 also has a third column describing the usage persona of the information handling system 100. This usage persona column may include data related to system operation and connection metrics and specifically whether, in this example, human presence is detected near the information handling system 100. Again, this data may be obtained from a number of sensors including a proximity sensor and/or a SAR detector.

Scenario #1 also has a fourth column describing the wireless ecosystem persona that includes, among other potential data, the peripheral telemetry data. Peripheral devices are used by a user to interact with the information handling system 100 and to provide output to the user or that the user implements to provide input to the information handling system 100. These peripheral devices may include the I/O devices 112 described herein including a keyboard 172, a mouse 170, a video/graphic display 110, a stylus 176, a headset 174 (audio or virtual reality (VR)), and a trackpad 178. In the first scenario, a headset 174 operating under a Wi-Fi wireless protocol and a mouse 170 operating under a Bluetooth® ("BT") wireless protocol is indicated as being present within the persona context. Because a user may interact with, for example, an online gaming application being executed on the information handling system 100, the headset 174 may be used by the user to interact verbally with other online users and hear gameplay sounds or may be a VR headset. The mouse 170 may also be used by a user during the execution of a gaming application to make selections during gameplay.

Scenario #1 also has a fifth column describing the link persona describing the data transmission requirements to be used under which the RF subsystems 130-1, 130-2, 130-3 currently operating. In the example presented in scenario #1, the link persona indicates that the host Wi-Fi or the Wi-Fi RF subsystem (e.g., 130-1, 130-2, or 130-3) is operating under very high data throughput (VHT) and a concurrent dual-band (CDB) mode. The VHT mode may be a result of the type of application being executed on the information handling system 100 such as the audio-visual streaming application or online gaming application described herein both of which have a relatively higher transception of data across a network than, for example, an email application. The CDB (aka: simultaneous dual band), in relation to the operation of any antenna 132, may be the operation of those antennas at two separate networks or devices simultaneously using both 2.4- and 5-GHz frequency bands, for example. This, along with potentially doubling the available bandwidth, allows for more reliable network connections to be established. The link persona column may also include other system operation and connection metrics that include application telemetry data descriptive of an application being executed on the information handling system 100. For example, the system operation and connection metrics may include data describing that an audio/video streaming application is being executed that indicates that a relatively higher data transmission bandwidth low latency (avoid stalls) is necessary to properly execute that application in comparison to, for example, the execution of an email application. Similarly, an online gaming application may also be an example application that indicates that data transmissions may be high during execution and the system operation and connection metrics presented in the third column describing this usage context. It is therefore appreciated that the data presented in any of the columns under the "System and Usage Personas" column shown in Table 1 may include more or less data used as input to the antenna selection algorithm 164 as described herein. Still further, in an embodiment, the link persona may also include data describing latency, packet loss, network congestion, and prediction error either detectable at the radios of the information handling system or via the sideband communications establishing the OOB communication with an information handling system management system such as Dell Optimizer®. Still further, the link persona may also include data describing total available bandwidth on any given network. Again, this data may be provided via the sideband communications establishing the OOB communication with an information handling system management system and may describe what network slices are provided for the various data transmission (e.g., audio data, video data, web traffic, email data, and file transfer data).

As a result of the inputs into the antenna selection algorithm 164 such as the system configuration persona, the usage persona, the wireless ecosystem persona, and the link persona (e.g., examples shown in columns 2-5 of Table 1), the antennas 148, 150, 152, 154, 156, 158 may be assigned to specific RF subsystems 130-1, 130-2, 130-3 according to Table 1 thereby mapping the antenna resources of the information handling system 100. Continuing with scenario #1 in Table 1, a WWAN radio (e.g., second RF subsystem 130-2 with its second RF front end 125-2) may have four antennas, a first antenna 148, a second antenna 150, a third antenna 152, and fourth antenna 154, to transceive data using a specific wireless protocol. Although these four antennas 148, 150, 152, 154 may be operatively coupled to a WWAN radio such as a cellular RF subsystem, one of these antennas (e.g., a second antenna 150) may be switched from being operatively coupled to the cellular RF subsystem to an out-of-band (OOB) Wi-Fi RF subsystem (e.g., the third RF subsystem 130-3 with its third RF front end 125-3) controlled by an embedded controller (EC). Moreover, one or more antennas 132 may be designated for concurrent Bluetooth operation depending on the detected wireless connectivity context of the plural personas for the information handling system 100. This may be done according to the output presented to the antenna controller 140 after executing the antenna selection algorithm 164. According to this output, the first antenna 148 may be operatively coupled to the second RF subsystem 130-2 via the second RF front end 125-2 to scan for cellular network connectivity. The second antenna 150 (as indicated in the $7^{th}$ column, Scenario #1, Table 1) may not be connected to the second RF subsystem 130-2 and, instead operatively coupled to the third RF subsystem 130-3 to scan for the OOB provisioning and receiving of the system operation and connection metrics as described herein. The third antenna 152 may be operatively coupled to the first RF subsystem 130-1 via the first RF front end 125-1 to operate under a 5 GHz frequency. The fourth antenna 154 is also operatively coupled to the first RF subsystem 130-1 via the first RF front end 125-1 and used to operate under a 5 GHz frequency. This is done in order to optimize the Wi-Fi connectivity per the radio context presented in this scenario (column 5, scenario #1, Table 1) that indicates that a very high throughput (VHT) is necessary to transceive the data to and from the information handling system 100. The antenna controller 140 may assign these antennas 148, 150, 152, 154 to these RF subsystems via use of one or more switches 168-1, 168-2, and 168-3 as described in more detail in connection with FIG. 3 herein.

Table 1 also shows two antennas (e.g., a fifth antenna 156 and a sixth antenna 158) may be associated with a host (e.g., information handling system 100) Wi-Fi Radio such as a Wi-F-RF subsystem (e.g., first RF subsystem 130-1 with its first RF front end 125-1). In scenario #1, the fifth antenna 156 is switched from the first RF subsystem 130-1 to be used by the second RF subsystem 130-2 via a first switch 168-1. This allows the second RF subsystem 130-2 to operate under a concurrent dual band (e.g., column 5, scenario #1, Table 1) at, for example, 5 GHz and 2.4 GHz. This allows the fifth antenna 156 to be concurrently, operatively coupled to a Wi-Fi protocol network as well as, in this example scenario #1, a peripheral device such as a mouse (column 12, scenario #1, Table 1) under Bluetooth. In an embodiment, the sixth antenna 158 may be operatively coupled, at 2.4 GHz, to another peripheral device such as a headset via Bluetooth communication.

The arrangement of the antennas 148, 150, 152, 154, 156, 158 to be operatively coupled to a specific RF subsystem 130-1, 130-2, 130-3 via manipulation of one or more switches 168-1, 168-2, 168-3 allows for the antenna controller 140 to prioritize for specific wireless protocols based on the received peripheral telemetry data, system operation and connection metrics, and configuration data. By using this data to assign the antennas 148, 150, 152, 154, 156, 158 in this manner the information handling system 100 may intelligently manage resources, in a closed loop fashion, to distribute wireless resources based on the persona in which the information handling system 100 is currently working under. This allows for the selection of the best antennas 148, 150, 152, 154, 156, 158 to use for connection to a network and any peripheral device at any given time. In this manner the information handling system 100 can dynamically distribute and optimize these wireless resources by defining a usage persona, system configuration persona, wireless ecosystem persona, and link persona. Through continual closed loop feedback, this data may be used to optimize those wireless resources accordingly. Table 1 also shows a second scenario where the switches 168-1, 168-2, and 168-3 may be accessed by the antenna controller 140 to optimize the use of those wireless resources based on the input (e.g., columns 2-5, scenario #2, Table 1) according to a new persona the information handling system 100 has detected to be within.

Table 1 also shows a second scenario, Scenario #2. Like the first scenario, scenario #2 includes system configuration persona data indicating that the information handling system 100 is currently in a tablet configuration. The usage persona data indicates that there is human proximity next to at least one antenna 132. The wireless ecosystem persona data indicates that no peripheral device is currently couplable to the information handling system 100. Additionally, the link persona data indicates that the host Wi-Fi or the Wi-Fi RF subsystem (e.g., 130-1, 130-2, or 130-3) is operating under very high data throughput (VHT) and a concurrent dual-band (CDB) mode with some of the antennas operating under a 4×4 MIMO LTE protocol. Again, as output, the first antenna 148 is connected to the second RF subsystem 130-2. The second antenna 150 is also operatively coupled to the second RF subsystem 130-2 under a MIMO configuration. The third antenna 152 is indicated as not being connected but instead is used by the third RF subsystem 130-3 to scan for a wireless connection. The fourth antenna 154 is connected to a Wi-Fi network using a 5 GHz frequency. The fifth antenna 156 and sixth antenna 158 are also connected to a Wi-Fi network at using a 5 GHz frequency.

FIG. 1 also shows that the information handling system 100 may be operatively coupled to a wireless network 134. In an embodiment, the wireless network 134 may have a wireless mesh architecture in accordance with mesh networks described by the wireless data communications standards or similar standards in some embodiments but not necessarily in all embodiments. The wireless interface adapter 120 may also connect to the external network via a WPAN, WLAN, WWAN or similar wireless switched Ethernet connection in some embodiments. The wireless data communication standards set forth protocols for communications and routing via access points, as well as protocols for a variety of other operations. Other operations may include handoff of client devices moving between nodes, self-organizing of routing operations, or self-healing architectures in case of interruption.

In an embodiment, the information handling system 100 may be operatively coupled to a network using one or more of the antennas 148, 150, 152, 154, 156, 158 using a wireless protocol based on the following example table, Table 2:

TABLE 2

| | Antenna RAT Operation Map | | |
|---|---|---|---|
| | 4G | 5G | Wi-Fi/ Bluetooth (BT) |
| First Antenna | Main - Transception MIMO - Reception | Main - Transception MIMO - Reception | OOB Wi-Fi |
| Second Antenna | Main - Transception MIMO Reception | Main - Transception MIMO - Reception | OOB Wi-Fi |
| Third Antenna | MIMO Transception | MIMO Transception | Host Wi-Fi Div OOB Wi-Fi |
| Fourth Antenna | MIMO Reception | MIMO Reception | Host Wi-Fi Div |
| Fifth Antenna | N/A | N/A | Host Wi-Fi/BT CDB |
| Sixth Antenna | N/A | N/A | Host Wi-Fi/BT CDB OOB Wi-Fi |

Here the antennas are described as being capable (or not) of being used to operate under 4G, 5G, or Wi-Fi/Bluetooth (BT) wireless protocols. Where table 2 denotes multiple-in-multiple-out (MIMO) transmission capabilities, these antennas capable of this MIMO transception may cooperate to increase the amount of data sent from and received at the wireless interface adapter 120 and the RF subsystems 130-1, 130-2, and 130-3. The third antenna 152 and fourth antenna 154, in this example embodiment, may be shared or repurposed ("Div") to operate under different wireless protocols based on the output from the executed antenna selection algorithm 164 by the antenna controller 140 as described herein.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 134. Further, the instructions 124 may be transmitted or received over the network 134 via the network interface device or wireless interface adapter 120.

Wireless interface adapter 120 represents a network interface card (NIC) disposed within information handling system 100, on a main circuit board of the information handling system, integrated onto another component such as processor 102, in another suitable location, or a combination thereof. The wireless interface adapter 120 can include another information handling system, a data storage system, another network, a grid management system, another suitable resource, or a combination thereof. Wireless interface adapter 120 in an embodiment may operably connect to a network 134. Connection to network 134 may be wired or wireless.

The network interface device shown as wireless interface adapter 120 can provide connectivity to a network 134, such as a wide area network (WAN), a local area network (LAN), wireless local area network (WLAN), a wireless personal area network (WPAN), a wireless wide area network (WWAN), or other network. Connectivity may be via wired or wireless connection. Wireless interface adapter 120 may include an adaptive massive MIMO Multiplexer with transmitter/receiver circuitry, wireless controller circuitry, amplifiers and other circuitry for wireless communications. The wireless interface adapter 120 may also include antennas 132 as described above which may be tunable antenna systems for use with the system and methods disclosed in the embodiments herein. The antenna controller 140 may also include wireless controllers to manage authentication, connectivity, communications, power levels for transmission, buffering, error correction, baseband processing, and other functions of the wireless interface adapter 120.

The information handling system 100 can include a set of instructions 124 that can be executed to cause the computer system to perform any one or more of the methods or computer-based functions disclosed herein. For example, instructions 124 may execute an antenna selection algorithm, various software applications, software agents, or other aspects or components. Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and may include a computer-readable medium 122 in which one or more sets of instructions 124 such as software can be embedded to be executed by the processor 102 and antenna controller 140 to perform the processes described herein. Similarly, main memory 104 and static memory 106 may also contain a computer-readable medium for storage of one or more sets of instructions, parameters, or profiles 124 including one or more look-up tables and/or one or more antenna selection algorithms 164. The disk drive unit 116 or static memory 106 also contain space for data storage. Further, the instructions 124 may embody one or more of the methods or logic as described herein. For example, instructions relating to the dynamic switching of the antennas 148, 150, 152, 154, 156, 158 using the antenna selection algorithm 164 as described in the embodiments herein may be stored in a static memory 104. In a particular embodiment, the instructions, parameters, and profiles 124 may reside completely, or at least partially, within the main memory 104, the static memory 106, and/or within the disk drive 116 during execution by the processor 102 or an antenna controller 140 of information handling system 100. The main memory 104 and the processor 102 also may include computer-readable media.

Main memory 104 or other memory of the embodiments described herein may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The antenna selection algorithm 164 and sideband serial messaging protocol 142 and the drive unit 116 may include access to a computer-readable medium 122 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
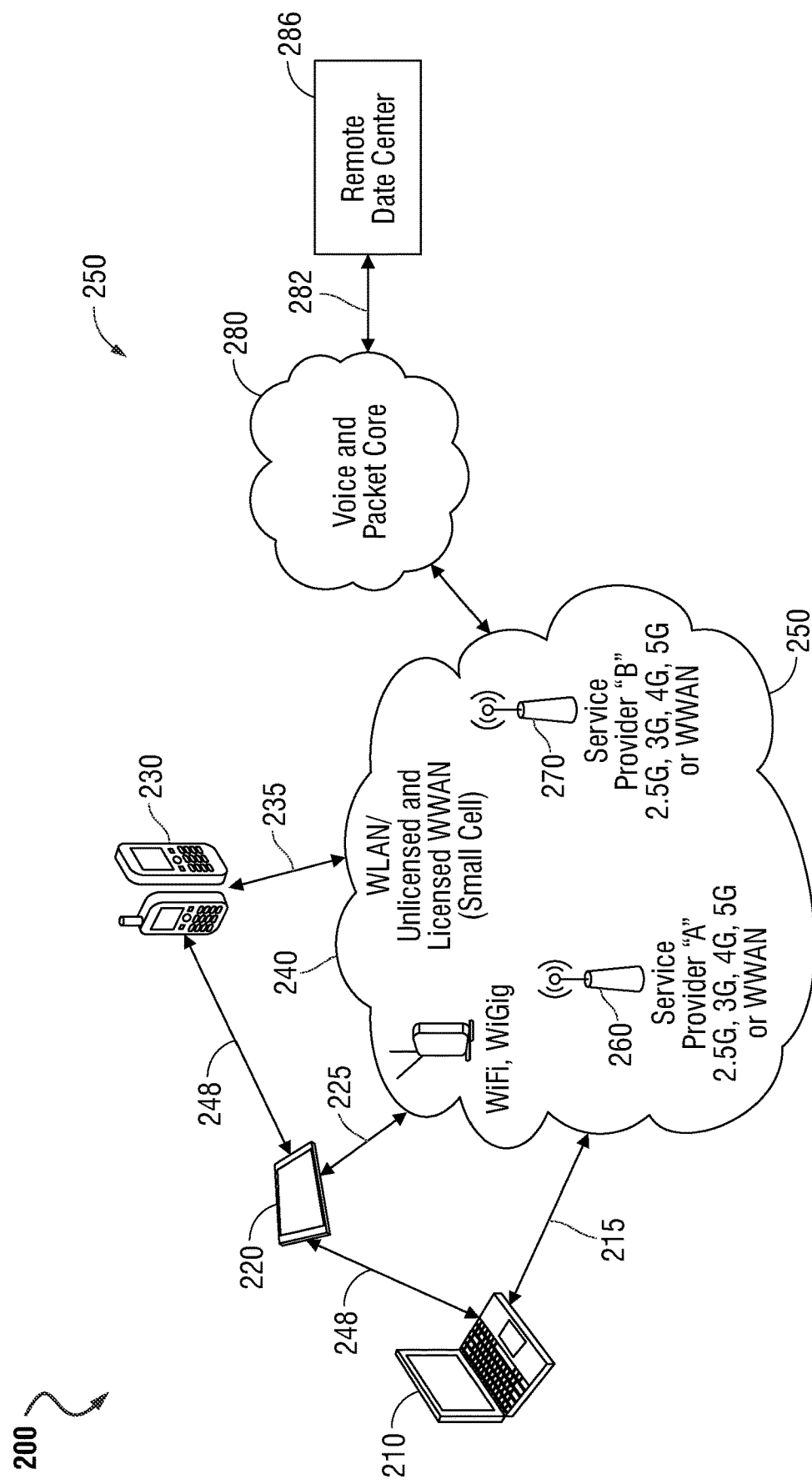
FIG. 2 is a block diagram of a network environment offering several communication technology options and mobile information handling systems according to an embodiment of the present disclosure.

FIG. 2 illustrates a network 200 that can include one or more information handling systems 210, 220, 230. The information handling systems 210, 220, 230 shown in FIG. 2 may be similar to the information handling system 100 described in connection with FIG. 1. In a particular embodiment, network 200 includes networked mobile information handling systems 210, 220, and 230, wireless network access points, and multiple wireless connection link options. A variety of additional computing resources of network 200 may include client mobile information handling systems, data processing servers, network storage devices, local and wide area networks, or other resources as needed or desired. As partially depicted, information handling systems 210, 220, 230 may be a laptop computer, tablet computer, 360-degree convertible systems, wearable computing devices, or a smart phone device. These mobile information handling systems 210, 220, and 230, may access a wireless local network 240, or they may access a macro-cellular network 250. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network such as a voice and packet core 280. For example, wireless network access points (e.g., 160 FIG. 1) or base stations (e.g., 162, FIG. 1) may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, IEEE 802.11ax-2021, (e.g., Wi-Fi 6 and 6E, 6 GHz technologies), or emerging 5G small cell WWAN communications such as gNodeB, eNodeB, or similar wireless network protocols and access points. Alternatively, other available wireless links within network 200 may include macro-cellular connections 250 via one or more service providers 260 and 270. As described herein, a plurality of antennas may be operatively coupled to any of the macro-cellular connections 250 via one or more service providers 260 and 270 or to the wireless local area networks (WLANs) selectively based on the SAR data, RSSI data, configuration data, system operation and connection metrics, peripheral telemetry data, and antenna mounting locations (e.g., spatial locations of antennas within the information handling system) associated with each information handling systems 210, 220, 230 as described herein. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells. As described herein, utilization of RF communication bands according to several example embodiments of the present disclosure may include bands used with the WLAN standards and WWAN carriers which may operate in both licensed and unlicensed spectrums. For example, both WLAN and WWAN may use the Unlicensed National Information Infrastructure (U-NII) band which typically operates in the ~5 MHz frequency band such as 802.11 a/h/j/n/ac/ax (e.g., center frequencies between 5.170-7.125 GHz). WLAN, for example, may operate at a 2.4 GHz band, 5 GHz band, and/or a 6 GHz band according to, for example, Wi-Fi, Wi-Fi 6, or Wi-Fi 6E standards. WWAN may operate in a number of bands, some of which are proprietary but may include a wireless communication frequency band. For example, low-band 5G may operate at frequencies similar to 4G standards at 600-850 MHz. Mid-band 5G may operate at frequencies between 2.5 and 3.7 GHz. Additionally, high-band 5G frequencies may operate at 25 to 39 GHz and even higher. In additional examples, WWAN carrier licensed bands may operate at the new radio frequency range 1 (NRFR1), NFRF2, bands, and other known bands. Each of these frequencies used to communicate over the network 134 may be based on the radio access network (RAN) standards that implement, for example, eNodeB or gNodeB hardware connected to mobile phone networks (e.g., cellular networks) used to communicate with the information handling system 100. In the example embodiment, mobile information handling system 100 may also include both unlicensed wireless RF communication capabilities as well as licensed wireless RF communication capabilities. For example, licensed wireless RF communication capabilities may be available via a subscriber carrier wireless service operating the cellular networks. With the licensed wireless RF communication capability, an WWAN RF front end of the information handling system 100 may operate on a licensed WWAN wireless radio with authorization for subscriber access to a wireless service provider on a carrier licensed frequency band. WLAN such as Wi-Fi (e.g., Wi-Fi 6) may be unlicensed.

In some embodiments according to the present disclosure, a networked mobile information handling system 210, 220, or 230 may have a plurality of wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or the plurality of antennas in each information handling system 210, 220, 230 may be used on each of the wireless communication devices such as according to embodiments herein and may be suited to plural RF bands. Example competing protocols may be local wireless network access protocols such as Wi-Fi/WLAN, WiGig, and small cell WWAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands may be subject to sharing include 2.4 GHz, 60 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on a mobile information handling system 210, 220 or 230 via concurrent communication wireless links on both WLAN and WWAN radios and antenna systems. In some embodiments, concurrent wireless links may operate within the same, adjacent, or otherwise interfering communication frequency bands and may be required to utilize spaced antennas. The antenna may be a transmitting antenna that includes high-band, medium-band, low-band, and unlicensed band transmitting antennas in embodiments herein. The antenna may cooperate with other antennas in a N×N MIMO array configuration according to the embodiments described herein. Alternatively, embodiments may include a single transceiving antennas capable of receiving and transmitting, and/or more than one transceiving antennas. Each of the antennas included in the information handling system 100 in an embodiment may be subject to the FCC regulations on specific absorption rate (SAR).

The voice and packet core network 280 shown in FIG. 2 may contain externally accessible computing resources and connect to a remote data center 286. The voice and packet core network 280 may contain multiple intermediate web servers or other locations with accessible data (not shown). The voice and packet core network 280 may also connect to other wireless networks similar to 240 or 250 and additional mobile information handling systems such as 210, 220, 230 or similar connected to those additional wireless networks. Connection 282 between the wireless network 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more mobile information handling systems 210, 220, and 230. Alternatively, mobile information handling systems 210, 220, and 230 may connect to the external network via base station locations at service providers such as 260 and 270. These service provider locations may be network connected via backhaul connectivity through the voice and packet core network 280.

Remote data centers 286 may include web servers or resources within a cloud environment that operate via the voice and packet core 280 or other wider internet connectivity. For example, remote data centers can include additional information handling systems, data processing servers, network storage devices, local and wide area networks, or other resources as needed or desired. Having such remote capabilities may permit fewer resources to be maintained at the mobile information handling systems 210, 220, and 230 allowing streamlining and efficiency within those devices. Similarly, remote data center permits fewer resources to be maintained in other parts of network 200. In an example embodiment, the mobile information handling systems 210, 220, and 230 may communicate with a backend server such as the remote data center 286 or other server via OOB on at least one network (e.g., Wi-Fi) to obtain this data from one of an information handling system management system such as Dell Optimizer® or a third-party service provider organization contracted to provide this data. Again, this remote information handling system management system may operate as a management and operations service provider administrator that is placed between information handling system (e.g., a host device) and a wireless network service provider such as for an enterprise owned or third party provided wireless network. The data requested by the mobile information handling systems 210, 220, and 230 from the remote data center 286 may include any data associated with the usage persona, the system configuration persona, the wireless ecosystem persona, the link persona described herein and specifically network data for all wireless networks managed by the remote data center 286.

Although 215, 225, and 235 are shown connecting wireless adapters of mobile information handling systems 210, 220, and 230 to wireless networks 240 or 250, a variety of wireless links are contemplated. Wireless communication may link through a wireless access point (Wi-Fi or WiGig), through unlicensed WWAN small cell base stations such as in network 240 or through a service provider tower and base stations such as that shown with service provider A 260 or service provider B 270 and in network 250. In other aspects, mobile information handling systems 210, 220, and 230 may communicate intra-device via 248 when one or more of the mobile information handling systems 210, 220, and 230 are set to act as an access point or even potentially an WWAN connection via small cell communication on licensed or unlicensed WWAN connections. For example, one of mobile information handling systems 210, 220, and 230 may serve as a Wi-Fi hotspot in an embodiment. Concurrent wireless links to information handling systems 210, 220, and 230 may be connected via any access points including other mobile information handling systems as illustrated in FIG. 2.

Figure 3:
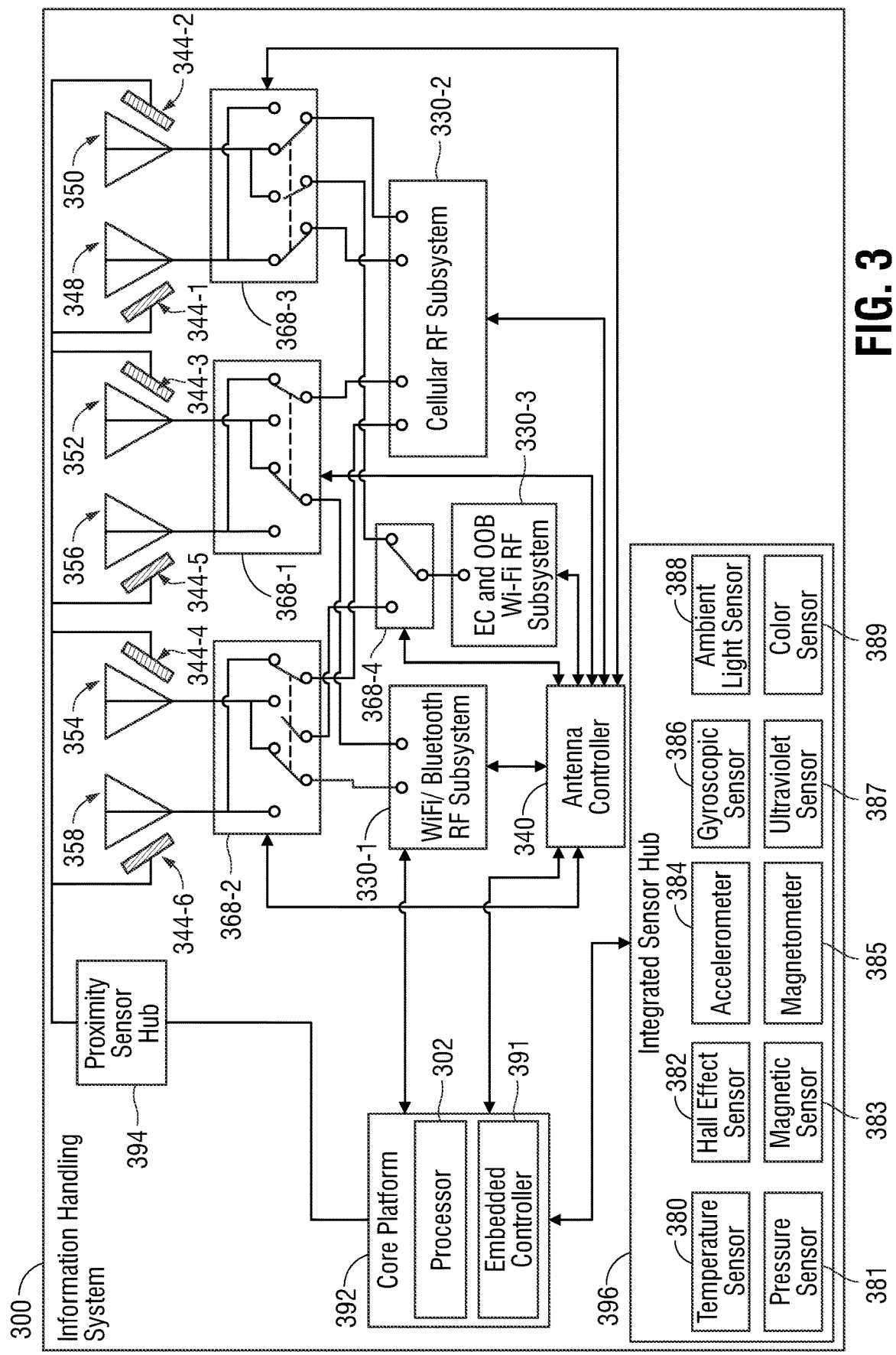
FIG. 3 is a block diagram illustrating an information handling system with wireless control system for increasing transceiving coverage based on the switched antennas among a plurality of radio frequency (RF) subsystems described herein according to an embodiment of the present disclosure.

FIG. 3 is a block diagram illustrating an information handling system 300 for increasing transceiving coverage based on the switched antennas 348, 350, 352, 354, 356, 358 among a plurality of radio frequency (RF) subsystems 330-1, 330-2, 330-3 described herein according to an embodiment of the present disclosure. In this embodiment, the information handling system 300 may include similar components as those described in connection with FIG. 1 such as a processor, a PMU, a BIOS, an OS, various input/output devices, among other components.

The information handling system 300 may include an antenna controller 340 operatively coupled to, in this embodiment, six different antennas 348, 350, 352, 354, 356, 358. In the embodiments, a first antenna 348, a second antenna 350, a third antenna 352, a fourth antenna 354, a fifth antenna 356, and a sixth antenna 358 may each be associated with its own proximity sensor 344-1, 344-2, 344-3, 344-4, 344-5, 344-6. The proximity sensors 344-1, 344-2, 344-3, 344-4, 344-5, 344-6 associated with each of these antennas 348, 350, 352, 354, 356, 358 are used to determine a proximity of a user or other human by the information handling system 100 and, more particularly, by one of the antennas 348, 350, 352, 354, 356, 358. In an embodiment, the proximity sensors 344-1, 344-2, 344-3, 344-4, 344-5, 344-6 may be or include a specific absorption rate (SAR) sensor. A SAR sensor may be used to provide to a proximity sensor hub 394 data describing the location of a user's body near an antenna 348, 350, 352, 354, 356, 358. The SAR sensor may determine proximity data used to extrapolate if and to what level the user's body is absorbing RF electromagnetic radiation emitted from or directed to any of the antennas 348, 350, 352, 354, 356, 358 for safety considerations and, also, affecting the ability of the antennas 348, 350, 352, 354, 356, 358 to transmit or receive data.

In the embodiment shown in FIG. 3, the antenna controller 340 is associated with a number of RF subsystems 330-1, 330-2, 330-3. A Wi-Fi/Bluetooth RF subsystem 330-1 may include any circuitry such as front ends, modems, protocol modules, amplifiers, filters, and tuners, among others that interfaces with antenna systems including each of the third antenna 253, fourth antenna 354, fifth antenna 356, and sixth antenna 358 and the antenna controller 340. The Wi-Fi/Bluetooth RF subsystem 330-1 may also include a number of ports used to dynamically and operatively couple the third antenna 253, fourth antenna 354, fifth antenna 356, and/or sixth antenna 358 to the Wi-Fi/Bluetooth RF subsystem 330-1 in a wireless front end with switching capabilities. The Wi-Fi/Bluetooth RF subsystem 330-1 may be part of the antenna controller 340 or may be separate circuits, such as integrated circuits on a wireless adapter in various embodiments.

The antenna controller 340 may also be associated with and operatively coupled to a cellular RF subsystem 330-2. A cellular RF subsystem 330-2 may include any circuitry such as front ends, modems, protocol modules, amplifiers, filters, and tuners, among others that interfaces with antenna systems including each of the first antenna 348, second antenna 350, third antenna 253, and fourth antenna 354 along with the antenna controller 340. The cellular RF subsystem 330-2 may also include a number of ports used to dynamically and operatively couple the first antenna 348, second antenna 350, third antenna 253, and fourth antenna 354 to the cellular RF subsystem 330-2 via a switchable wireless front end. The cellular RF subsystem 330-2 may be part of the antenna controller 340 or may be separate circuits, such as integrated circuits on a wireless adapter in various embodiments.

The antenna controller 340 may also be associated with and operatively coupled to a OOB W-F RF subsystem and embedded controller (EC) 330-3. A OOB W-F RF subsystem and EC 330-3 may include any circuitry such as front ends, modems, protocol modules, amplifiers, filters, and tuners, among others that interfaces with antenna systems including each of the first antenna 348 and fourth antenna 354 along with the antenna controller 340. The OOB W-F RF subsystem and EC 330-3 may also include a number of ports used to dynamically and operatively couple the first antenna 348 and fourth antenna 354 to the OOB W-F RF subsystem and EC 330-3 via a switchable wireless front end. The OOB W-F RF subsystem and EC 330-3 may be part of the antenna controller 340 or may be separate circuits, such as integrated circuits on a wireless adapter in various embodiments.

In the embodiments described herein, the Wi-Fi/Bluetooth RF subsystem 330-1 along with the cellular RF subsystem 330-2 and OOB Wi-Fi RF subsystem 330-3 may help to provide an oscillation current to be passed to these antennas to propagate a signal from the antennas at a specific frequency and under a particular wireless protocol (e.g., Bluetooth, Wi-Fi, other WLAN protocol, or WWAN protocol). The RF subsystems 330-1, 330-2, 330-3 and the antenna controller 340 are operatively coupled to one or more switches 368-1, 368-2, 368-3 and the antennas 348, 350, 352, 354, 356, 358. In this embodiment, the switches 368-1, 368-2, 368-3 are one of a double pole, double throw (DPDT) switch or triple pole, double throw (TPDT) switches. In an embodiment, the first switch 368-1 is a DPDT switch while the second switch 368-2 and third switch 368-3 may be TPDT switch. These switches 368-1, 368-2, 368-3, and specifically the first switch 368-1 and second switch 368-2 in this exemplary embodiment, may be multiple port switches that allow the Wi-Fi/Bluetooth RF subsystem 330-1 to be operatively coupled to any of the third antenna 253, fourth antenna 354, fifth antenna 356, and sixth antenna 358. These switches 368-1, 368-2, 368-3 also allow the cellular RF subsystem 330-2 to be operatively coupled to the first antenna 348, second antenna 350, third antenna 253, fourth antenna 354, fifth antenna 356, or sixth antenna 358. In an embodiment, the switches 368-1, 368-2, 368-3 may operatively couple the RF subsystems 330-1, 330-2, 330-3 and antenna controller 340 to the antennas 348, 350, 352, 354, 356, 358 in order to allow the antennas to be operatively and dynamically coupled to any given RF subsystems 330-1, 330-2, 330-3 based on the output from the execution of the antenna selection algorithm by the antenna controller 340 as described herein.

Again, in order to make a decision regarding which of the antennas 348, 350, 352, 354, 356, 358 are to be operatively coupled to an RF subsystem 330-1, 330-2, 330-3, the antenna controller 340 may receive usage persona, the system configuration persona, the wireless ecosystem persona, the link persona data (e.g., peripheral telemetry data, system operation and connection metrics, and configuration data) from a plurality of sources within the information handling system 300. One source may include an integrated sensor hub 396. The integrated sensor hub 396 may include any single source location that provides data from, for example, a temperature sensor 380, a pressure sensor 381, a Hall effect sensor 382, a magnetic sensor 383, an accelerometer 384, a magnetometer 385, a gyroscopic sensor 386, an ultraviolet sensor 387, an ambient light sensor 388, and a color sensor 389 among other sensors. The data provided by these sensors may be classified as being included with any of the peripheral telemetry data of the wireless ecosystem persona data, the system operation and connection metrics of the link persona data, and the configuration data of the system configuration persona data. For example, the Hall effect sensor 382 may be placed at any location within the chassis of the information handling system 300 to detect the position of the individual parts of the information handling system 300 relative to each other. In a specific embodiment where the information handling system 300 is a laptop-type information handling system 100, the Hall effect sensor 382 may be placed in one or more of a display portion or base portions of the information handling system 300. In this embodiment, the Hall effect sensor 382, in combination with any orientation sensor, a gyroscopic sensor 386, and/or accelerometer 384, may detect when the display portion is moved away from a top surface of a based portion, a relative position of the display portion to the base portion, and/or when a back side of the display portion is placed against a bottom portion of the base portion of the information handling system 300. As described herein, this allows the Hall effect sensor 382 and other sensors to detect whether the laptop-type information handling system 300 is placed in an open configuration, a closed configuration, a tablet configuration, a dual tablet configuration, a laptop configuration, a tent mode configuration, a book configuration, as well as several other configurations described herein. This data may be used as part of the system configuration persona data (e.g., configuration data) and/or the link persona data (e.g., system operation and connection metrics) described herein that is later provided to the antenna controller 340. The Hall effect sensor 382 and other sensors may be similarly used in a dual screen-type information handling system 300 in order to detect the relative positions of each of the screens. Again, any data obtained by the Hall effect sensor and other sensors is presented to the antenna controller 340 for the antenna controller 340 to interpret and provide that system configuration persona data as input to the antenna selection algorithm as described herein.

As part of the sensor data provided to the antenna controller 340, the information handling system 300 may include a proximity sensor hub 394 that is operatively coupled to a proximity sensor 344-1, 344-2, 344-3, 344-4, 344-5, 344-6 situated near each of the antennas 348, 350, 352, 354, 356, 358. In an embodiment, each proximity sensor 344-1, 344-2, 344-3, 344-4, 344-5, 344-6 may detect the presence of a user's body part such as a hand or a lap. The detection of a user's body part may inhibit the transception of any of the antennas 348, 350, 352, 354, 356, 358 and the antenna controller 340, while executing the antenna selection algorithm, and this data may be provided as part of the input data under a category of the system operation and connection metrics. In an embodiment, the proximity sensor 344-1, 344-2, 344-3, 344-4, 344-5, 344-6 may include a SAR detector that detects the specific absorption rate of any transmitted or received data signals. This data may also be provided to the antenna controller 340 for to be used as input.

The antenna controller 340 is also operatively coupled to the OOB Wi-Fi RF subsystem and EC 330-3 in order to receive system operation and connection metrics and network conditions (e.g., link delay, congestion, retries, etc.) descriptive of the available networks for the information handling system 300 to be coupled to, the signal QoS to any given access point or base station such as, RSSI data, BER data, SAR data, application telemetry data, among other data. This data may be obtained by the antenna controller 340 directing the OOB Wi-Fi RF subsystem and EC 330-3 to be operatively coupled to, in the embodiment shown in FIG. 3, one of the second antenna 350 or fourth antenna 354 to determine what networks are available for the information handling system 300 to be coupled to. In order to access the second antenna 350 or fourth antenna 354, the OOB Wi-Fi RF subsystem and EC 330-3 may be operatively coupled to a toggle switch 368-4 operated by one of the antenna controller 340 or the EC of the OOB Wi-Fi RF subsystem and EC 330-3. In an embodiment, this scanning by the OOB Wi-Fi RF subsystem and EC 330-3 may be carried out continuously in order to provide the antenna controller 340 updated system operation and connection metrics for input into the antenna selection algorithm described herein.

During operation, the antenna controller 340 also receives wireless ecosystem persona data that includes peripheral device telemetry data from any peripheral device wirelessly and operatively coupled to the information handling system 300 or available to be wirelessly coupled to the information handling system 300. This may include, for example, a wireless keyboard, a stylus, a mouse, a camera, displays, headsets, and the like. Because these peripheral devices are coupled to the information handling system 300 wirelessly, one of the antennas 348, 350, 352, 354, 356, 358 may be used to communicate with these peripheral devices. The presence of these peripheral devices may indicate the information handling system 300 is operating under a specific persona. For example, the information handling system 300 may be executing an online gaming system that requires VHT for its data requirements. In this example, a mouse or VR headset is often used to allow the user to interact with the game play. As described in connection with scenario #1, this persona may prioritize for 5 GHz Wi-Fi transmissions that allows for high data through put to accommodate for the requirements of the gaming application being executed. With the data descriptive of the peripheral telemetry data, the system operation and connection metrics, and the configuration data, the antenna controller 340 may assign the individual antennas 348, 350, 352, 354, 356, 358 to specific RF subsystems 330-1, 330-2, 330-3 that facilitate the best wireless connections with the access points or base stations as well as for the peripheral devices that may operate via Bluetooth, Wi-Fi, 5G, or other protocols in some embodiments. This optimizes the data transmission resources within the information handling system 300 based on the persona the information handling system 300 has detected to be operating within. By dynamically changing the assignment of the antennas 348, 350, 352, 354, 356, 358 to the RF subsystems 330-1, 330-2, 330-3 the antenna controller 340 achieves this optimization on a closed loop and continual basis.

Figure 4:
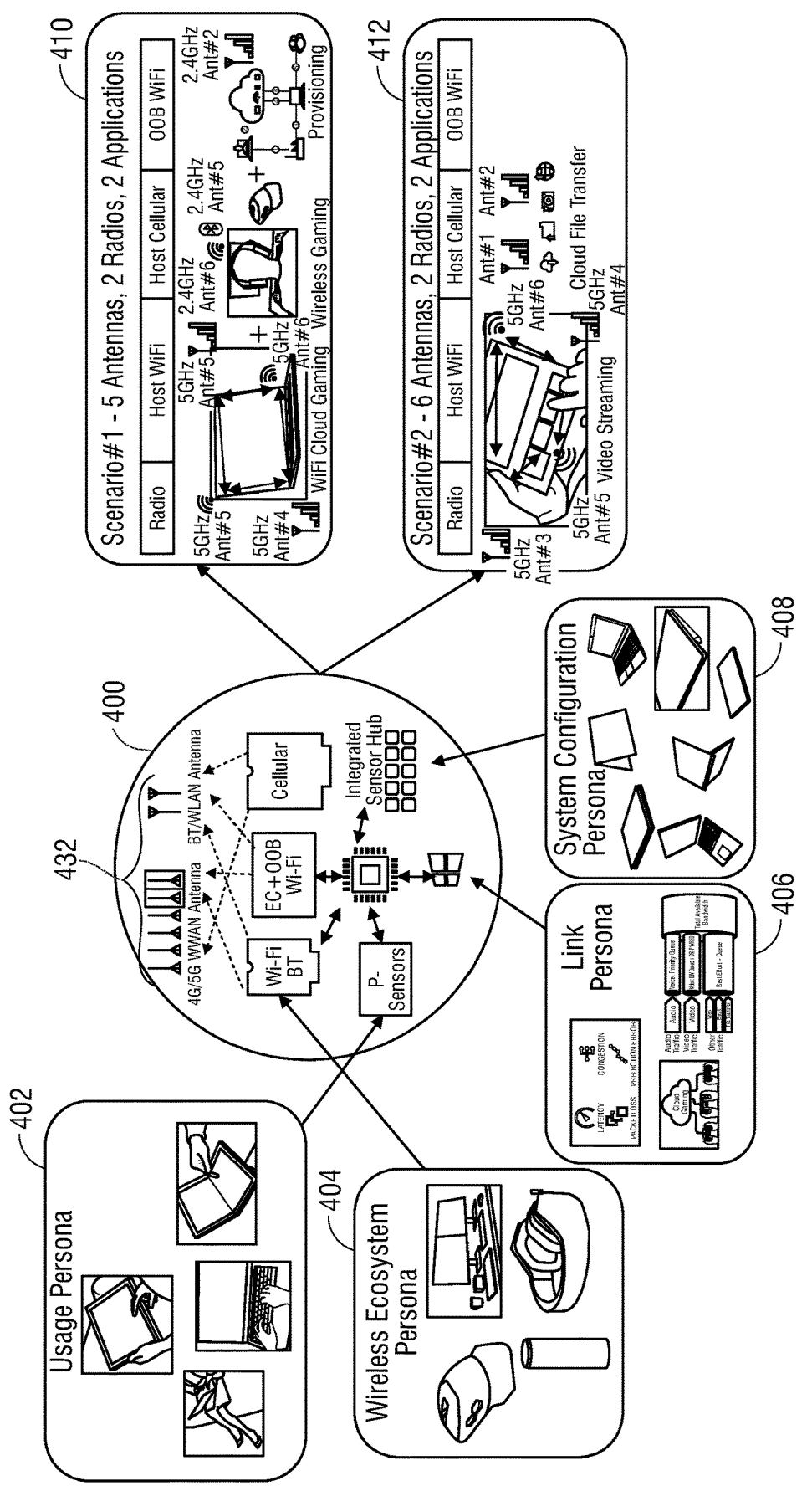
FIG. 4 is a block diagram of an intelligent wireless control system optimization engine illustrating two scenarios under which antennas within an information handling system are switched among a plurality of RF subsystems according to an embodiment of the present disclosure.

FIG. 4 is a block diagram illustrating two scenarios 410, 412 under which antennas 432 within the information handling system 400 are switched among a plurality of RF subsystems according to an embodiment of the present disclosure. In this embodiment, the information handling system 400 may include those sensors, RF subsystems, proximity sensors, switches, and embedded controllers as those described in connection with FIG. 3 and FIG. 1 to detect one or more information handling system 400 personas of operation describing the information handling system wireless connectivity context for an antenna selection algorithm.

FIG. 4 shows that the proximity sensors receive a usage persona 402 that describes, at least partially, whether any number of sensors have detected the presence of a user near the information handling system (e.g., human proximity). For example, the usage persona 402 may include data describing the proximity of a user's body next to the information handling system 400 or the antennas 432. This data may be RSSI data or other wireless signal quality metrics, in an embodiment. This usage data may be presented to the antenna controller of the information handling system 400 as described herein. In the examples described in connection with FIG. 1, the usage persona 402 and the associated data may be used as input to the antenna selection algorithm and form part of the system and usage persona data presented as input as described in connection with Table 1.

The antenna controller of the information handling system 400 may also receive data that describes the wireless ecosystem persona 404. This wireless ecosystem persona 404 may be part of the peripheral telemetry data and/or system operation and connection metrics used by the antenna controller as input to the antenna selection algorithm as described in connection with FIG. 1 and Table 1. In this embodiment show in FIG. 4, the wireless ecosystem persona 404 may include data describing which of a mouse, a wireless speaker, a wireless headset, VR headset, wireless keyboard, and/or a wireless display device are wirelessly, operatively coupled to or operatively couplable to the RF subsystems such as the Wi-Fi/Bluetooth RF subsystem described herein. In an embodiment, the wireless ecosystem persona 404 may also include peripheral telemetry data descriptive of the connectivity requirements for the one or more peripheral devices such as which wireless communication protocol the peripheral device may communicate with the information handling system 400, QoS, throughput, latency, congestion, dropped connection, among other metrics for the peripherals. In an embodiment, throughput specifications related to each of the peripheral devices may also be determined in order to determine whether a change with the combinations of peripherals operatively coupled wirelessly to the information handling system 400 changes the data throughput. For example, where a wireless display device and a VR headset are used as peripheral devices, the data throughput may be high thereby decreasing latency. In another embodiment where a wireless mouse and a VR headset the data throughput may be relatively low and the latency may be relatively low as well. Again, this data may be provided to the antenna controller as additional input to the antenna selection algorithm executed by the antenna controller to determine which of the antennas 432 should be coupled or not to specific RF subsystems. Again, in the examples described in connection with FIG. 1, the wireless ecosystem persona 404 and the associated data may be used as input to the antenna selection algorithm and forms part of the system and usage persona data presented as input as described in connection with Table 1.

The antenna controller may also receive link persona 406 data describing the links available to the information handling system 400 for data transmissions. The link persona 406 may include, for example system operation and connection metrics that is received locally or also from an external information handling system management system such as Dell Optimizer® via an OOB communication to determine the available wireless networks the information handling system 400 may be operatively coupled to. Additional data among the link persona 406 may include data transception telemetry data such as latency, packet loss congestion within the network among other network telemetry data. The link persona 406 may also include data describing the types of data transmissions provided for audio, video, web, email, and file transferring and which priority queue these types of data are transmitted under. Additionally, the link persona 406 may include, for example, the type of application being executed on the information handling system 400. In the examples presented herein, the amount of data transception required for a gaming or streaming application may be considered to be VHT while the data transception for an email application may be relatively lower throughput. This may include certain networking slicing data that each wireless network operates to prioritize data transception. Again, this data may be provided to the antenna controller for input into the antenna selection algorithm as described herein.

The antenna controller of the information handling system 400 may also receive system configuration persona data 408 that describes, in an example, the configuration data and/or system operation and connection metrics. In the example provided in FIG. 4, the system configuration persona data 408 may be descriptive of the orientation and configuration of the information handling system 400 during use. These configurations may include one of a tablet configuration, a dual tablet configuration, a laptop configuration, a tent mode configuration, a book configuration, as well as several other configurations described herein in connection with FIG. 1. Again, a variety of sensors may be used to determine the configuration and/or orientation of the information handling system 400 that includes, for example, a Hall effect sensor, a magnetometer, a proximity sensor, a hinge sensor, a light sensor, and a camera, among other sensors. The antenna controller of the information handling system 400 may also receive this additional system configuration persona data 408 as input to the antenna selection algorithm. As described in connection with FIG. 1 and Table 1, this system configuration persona data 408 may form part of the system and usage persona data used as input to the antenna selection algorithm in order to receive output in the form of a selection of which antennas are assigned to one of a plurality of RF radio subsystems.

With the usage persona 402, the wireless ecosystem persona 404 and any peripheral telemetry data, link persona 406 system operation and connection metrics, the system configuration persona 408, and usage persona 402, the antenna controller may input this data into an antenna selection algorithm to receive as output a determination as to how the antenna controller to switch between operating transceiving antennas by accessing one or more RF switches to dynamically change the assignment of the plurality of antennas 432 to the or more peripheral devices and plurality of operating wireless links. In an embodiment, the antenna selection algorithm may access a table such as Table 1, or be fed as inputs to a machine learning classifier to determine correlations to wireless contexts or to antenna assignments.

In one example embodiment, the embedded controller or processor executing code instructions of an antenna selection algorithm may access a Table and associated detected data from the personas 402, 404, 406, and 408 and other data inputs with a wireless context of scenario #1 of Table 1. Scenario #1 410 shows a graphical depiction of scenario #1 in Table 1 described herein. In scenario #1 (as described in the third row, Table 1 and in FIG. 1), system and usage persona data includes a first column that describes system configuration persona data descriptive of, at least, the configuration of the information handling system as described herein. In scenario #1, this system configuration persona includes an indication that the lid of the information handling system 400 is open. Scenario #1 also indicates that the usage context of the information handling system 400. This usage persona may include data related to system operation and connection metrics and specifically whether, in this example, human presence is detected near the information handling system 400. Again, this data may be obtained from a number of sensors. Scenario #1 also describes the wireless ecosystem persona that includes, among other potential data, peripheral device connection status (e.g., connected, not connected, sleep state, available, etc.) and the peripheral telemetry data. Peripheral devices are used by a user to interact with the information handling system 400 and to provide output to the user or that the user implements to provide input to the information handling system 400. These peripheral devices may include the wireless I/O devices described herein that includes a mouse and a headset. In the first scenario, an audio headset operating under a Wi-Fi wireless protocol and a mouse operating under a Bluetooth® ("BT") wireless protocol are indicated as being present within the persona context. Because a user may interact with, for example, an online gaming application being executed on the information handling system 400, the headset may be used by the user to interact verbally with other online users and hear gameplay sounds. The mouse may also be used by a user during the execution of a gaming application to make selections during gameplay. The information handling system 400 may have one or more antennas 432 to operatively couple these peripheral devices to the information handling system 400.

Scenario #1 also indicates that the link persona under which the RF subsystems are currently operating under indicates that the host Wi-Fi or the Wi-Fi RF is operating under very high data throughput (VHT) and a concurrent dual-band (CDB) mode. The VHT mode may also be a result of the type of application being executed on the information handling system 400 from usage persona data such as the audio-visual streaming application or online gaming application described herein both of which have a relatively higher transception of data across a network than, for example, an email application.

As such, in scenario #1, with the inputs into the antenna selection algorithm such as the usage persona 402, the wireless ecosystem persona 404, link persona 406, and system configuration persona data 408 as provided as the peripheral telemetry data, the system operation and connection metrics, and the configuration data (e.g., examples shown in columns 2-5 of Table 1), the antennas 432 may be assigned to specific RF subsystem accordingly.

Continuing with scenario #1 in Table 1 with reference to FIG. 4, a WWAN radio (e.g., second RF subsystem 130-2 with its second RF front end 125-2, FIG. 1) may have four antennas, a first antenna, a second antenna, a third antenna, and fourth antenna, to transceive data using a specific wireless protocol. Although these four antennas may be operatively coupled to a WWAN radio such as a cellular RF subsystem, one of these antennas (e.g., a second antenna) may be switched from being operatively coupled to the cellular RF subsystem to an out-of-band (OOB) Wi-Fi RF subsystem (e.g., the third RF subsystem 130-3 with its third RF front end 125-3, FIG. 1) controlled by an embedded controller (EC). Moreover, one or more antennas may be designated for concurrent Bluetooth operation depending on the detected wireless connectivity context of the plural personas for the information handling system 400. This may be done according to the output presented to the antenna controller after executing the antenna selection algorithm. According to this output, the first antenna may be operatively coupled to the second RF subsystem via the second RF front end to scan for cellular network connectivity. The second antenna (as indicated in the 7$^{th}$ column, Scenario #1, Table 1) may not be connected to the second RF subsystem and, instead operatively coupled to the third RF subsystem to scan for the OOB provisioning and receiving of the system operation and connection metrics as described herein. The third antenna may be operatively coupled to the first RF subsystem via the first RF front end to operate under a 5 GHz frequency. The fourth antenna is also operatively coupled to the first RF subsystem via the first RF front end and used to operate under a 5 GHz frequency. This is done in order to optimize the Wi-Fi connectivity per the radio context presented in this scenario (column 5, scenario #1, Table 1) that indicates that a very high throughput (VHT) is necessary to transceive the data to and from the information handling system 400. The antenna controller may assign these antennas to these RF subsystems via use of one or more switches (e.g., 168-1, 168-2, and 168-3, FIG. 1) as described in more detail in connection with FIG. 3 herein.

Table 1 also shows two antennas (e.g., a fifth antenna 156 and a sixth antenna 158, FIG. 1) may be associated with a host (e.g., information handling system 400) Wi-Fi Radio such as a Wi-F-RF subsystem (e.g., first RF subsystem 130-1 with its first RF front end 125-1, FIG. 1). In scenario #1, the fifth antenna is switched from the first RF subsystem to be used by the second RF subsystem via a first switch. This allows the second RF subsystem to operate under a concurrent dual band (e.g., column 5, scenario #1, Table 1) at, for example, 5 GHz and 2.4 GHz. This allows the fifth antenna to be concurrently, operatively coupled to a Wi-Fi protocol network as well as, in this example scenario #1, a peripheral device such as a mouse (column 12, scenario #1, Table 1) under Bluetooth. In an embodiment, the sixth antenna may be operatively coupled, at 2.4 GHz, to another peripheral device such as a headset via Bluetooth communication.

The arrangement of the antennas 432 to be operatively coupled to a specific RF subsystem via manipulation of one or more switches allows for the antenna controller to prioritize for specific wireless protocols (in scenario #1 a Wi-Fi wireless protocol) based on the received peripheral telemetry data, system operation and connection metrics, and configuration data and the persona data described herein. By using this data to assign the antennas 432 in this manner the information handling system 400 may intelligently manage resources, in a closed loop fashion, to distribute wireless resources based on the persona in which the information handling system 400 is currently working under. This allows for the selection of the best antennas 432 to use for connection to a network and any peripheral device at any given time. In this manner the information handling system 400 can dynamically distribute and optimize these wireless resources by defining a usage persona 402, wireless ecosystem persona 404, link persona 406, and system configuration persona data 408 and, through continual closed loop feedback, optimize those wireless resources accordingly. Scenario #2 (e.g., also described in Table 1 as scenario #2) also shows a second scenario where the switches may be accessed by the antenna controller to optimize the use of those wireless resources based on the input (e.g., columns 2-5, scenario #2, Table 1) according to a new persona the information handling system 400 has detected to be within. Like the first scenario, scenario #2 includes system configuration persona 408 data indicating that the information handling system 400 is currently in a tablet configuration. The usage persona data indicates that there is human proximity next to at least one antenna 432. The wireless ecosystem persona data indicates that no peripheral device is currently couplable to the information handling system 400 as indicated in Table 1. Additionally, the link persona data indicates that the host Wi-Fi or the Wi-Fi RF subsystem is operating under very high data throughput (VHT) and a concurrent dual-band (CDB) mode with some of the antennas operating under a 4×4 MIMO LTE protocol. Again, as output, a first antenna is connected to the second RF subsystem. A second antenna is also operatively coupled to the second RF subsystem under a MIMO configuration. A third antenna is indicated as not being connected but instead is used by the third RF subsystem to scan for a wireless connection. A fourth antenna is connected to a Wi-Fi network using a 5 GHz frequency. A fifth antenna and sixth antenna are also connected to a Wi-Fi network at using a 5 GHz frequency.

Although, Table 1 shows two scenarios, it is appreciated that more than two scenarios may be presented or maintained on such a look-up table. As such, it is appreciated that more rows may be added to Table 1 as additional and different inputs (e.g., usage persona, system persona, wireless ecosystem persona, the link persona, and other aspects of the information handling system 400 wireless connectivity context for antenna control) are presented to the antenna selection algorithm and used to determine how to assign the antennas to the RF subsystems.

Figure 5:
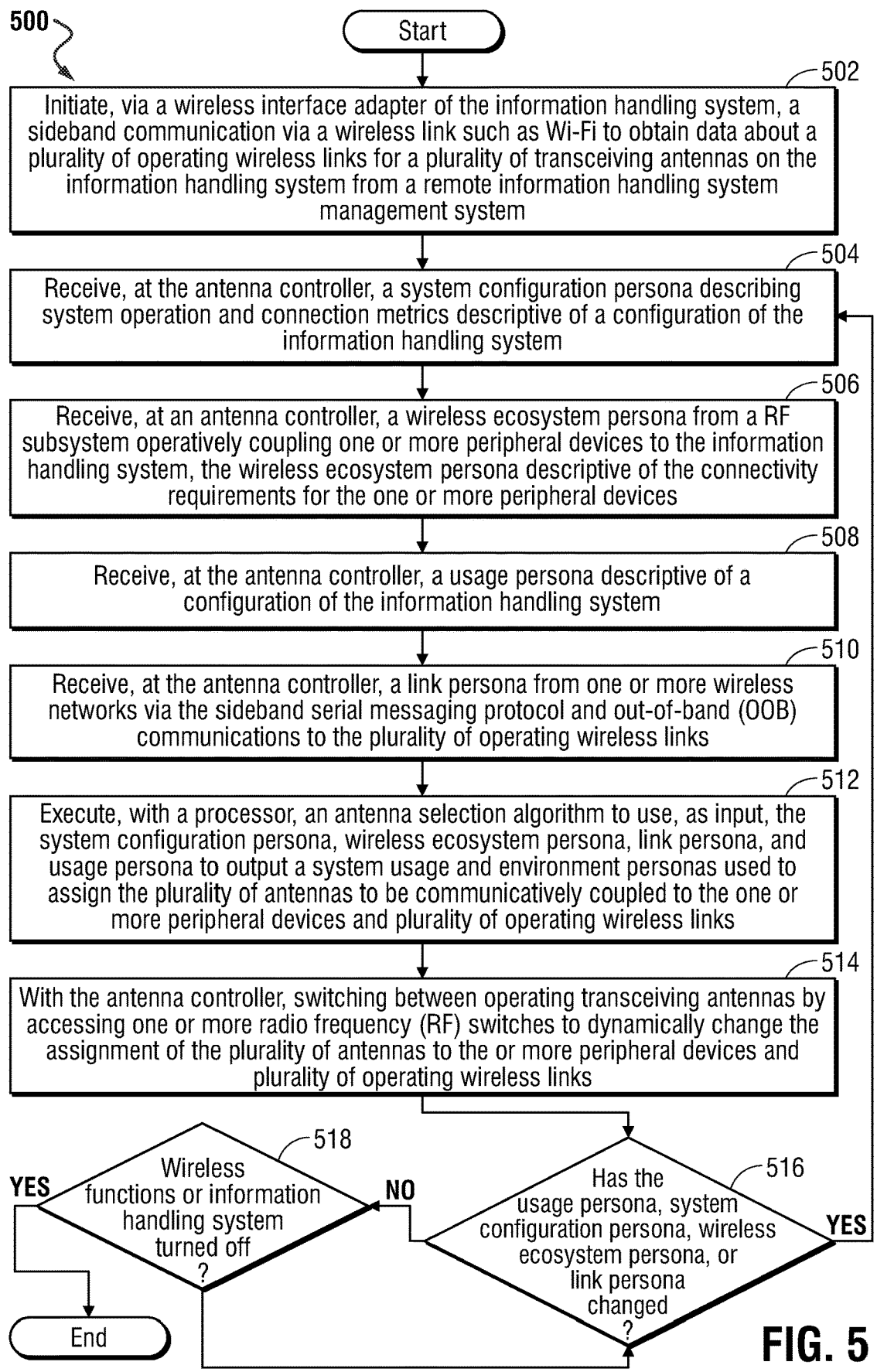
FIG. 5 is a flow diagram illustrating a method of executing an antenna selection algorithm executed by an information handling system to optimize connectivity resources according to an embodiment of the present disclosure.

FIG. 5 is a flow diagram illustrating a method 500 of executing an antenna selection algorithm executed by an information handling system according to an embodiment of the present disclosure. The method 500 may include, at block 502, initiating, via a wireless interface adapter of the information handling system, a sideband communication via a wireless link such as Wi-Fi to obtain data about a plurality of operating wireless links for a plurality of transceiving antennas on the information handling system from a remote information handling system management system such as Dell Optimizer®. As described herein, this sideband communication, when executed by an antenna controller and embedded controller, for example, initiates a sideband communication with at least one of the plurality of radios described herein and may establish a wireless connection via a OOB Wi-Fi RF subsystem to one or more networks. In an embodiment, the sideband communication may provide any wireless communication link with any wireless network. In an embodiment, a sideband communication link achieved via execution of the sideband serial messaging protocol may also allow the antenna controller to determine locally from RF subsystems which wireless networks and protocols are available to operatively couple the information handling system to a wireless network as well as any system operation and connection metrics associated with those wireless networks. Again, because the system operation and connection metrics include data descriptive of measured RSSI values and other metrics relating to signal quality and strength of any of each of a plurality of communication networks, the data obtained by the antenna controller may be used during execution of the antenna selection algorithm by an antenna selection controller or processor to determine which wireless network to operatively couple the information handling system to for various applications executing depending on the wireless connectivity context of the information handling system. In an embodiment, the antenna selection algorithm may include computer executable program code that, when executed by the antenna controller, receives these inputs and provides output describing which antennas to use to operatively couple an RF subsystem to one or more wireless networks and for wireless peripheral device operations.

The method 500 further includes receiving, at the antenna controller, a system configuration persona describing system operation and connection metrics at block 504. In an embodiment, the system configuration persona may describe whether human presence is detected near the information handling system. This data associated with the system configuration persona may be obtained from a number of sensors including a proximity sensor and/or a SAR detector. The system configuration persona may also include other system operation and connection metrics that include application telemetry data descriptive of an application being executed on the information handling system. The configuration of the information handling system may be determined by the antenna controller using a number of additional types of sensors. In the context of the information handling system being a 360-degree-type laptop, these sensors may be used to determine if the orientation the information handling system is placed in is one of a tablet configuration, a dual tablet configuration, a laptop configuration, a tent mode configuration, a book configuration, as well as several other configurations described herein. These variety of sensors may include, for example, a Hall effect sensor, a magnetometer, a proximity sensor, a hinge sensor, a light sensor, and a camera, among other sensors. Referring to FIG. 1, the antenna controller 140 may receive data from an integrated sensor hub data relating to orientation of the information handling system as described herein.

In an example embodiment, the Hall effect sensor, orientation sensors, or other sensors may be placed at any location within the chassis of the information handling system to detect the position of the individual parts of the information handling system relative to each other. In a specific embodiment where the information handling system is a laptop-type information handling system, the Hall effect sensor, orientation sensors, or other sensors may be placed in one or more of a display portion or base portions of the information handling system. In this embodiment, these sensors may detect when the display portion is moved away from a top surface of a based portion, a relative position of the display portion to the base portion, and/or when a back side of the display portion is placed against a bottom portion of the base portion of the information handling system. As described herein, this allows the sensor hub to detect whether the laptop-type information handling system is placed in a tablet configuration, a dual tablet configuration, a laptop configuration, a tent mode configuration, a book configuration, as well as several other configurations described herein. The sensor hub may be similarly used in a dual screen-type information handling system in order to detect the relative positions of each of the screens. Again, any data obtained by the sensor hub is presented to the antenna controller for the antenna controller to interpret and provide that orientation data as input to the antenna selection algorithm as described herein.

In an example embodiment, a magnetometer may be used to measure the earth's magnetic field at any location in order to detect an orientation of the information handling system relative to that magnetic field. In a specific embodiment, the magnetometer may be a three-axis magnetometer that eliminates the sensitivity to the way in which the information handling system is held or positioned. Again, any data obtained by the magnetometer, such as via a sensor hub, is presented to the antenna controller for the antenna controller to interpret and provide as input to the antenna selection algorithm as described herein.

As this configuration data is provided to the antenna controller at block 508, the antenna controller may determine, for example, whether the lid (e.g., display chassis) is closed or not. Again, because higher frequencies transmit and receive data at a relatively higher throughput, these higher frequencies may be more susceptible to physical barriers blocking the signal and metallic objects interfering with the signals. Because the lid of the information handling system may be made of metal and because it is placed at a relatively closer distance to the antennas when it is closed, this may affect the transmission capabilities of the antennas especially as the transmission and reception frequencies are higher.

The method 500 may further include receiving, at an antenna controller, a wireless ecosystem persona from a RF subsystem operatively coupling one or more peripheral devices to the information handling system, the wireless ecosystem persona data being descriptive of the connectivity requirements for the one or more peripheral devices at block 506. In an embodiment such as that described in connection with FIG. 3, the information handling system may include four WLAN antennas and two WWAN antennas. The locations of these antennas within the information handling system (e.g., along a right side of the base chassis, left side of the base chassis, in a hinge of the information handling system, etc.) and their positions relative to a peripheral device may influence their transception capabilities relative to a peripheral device. Additionally, the type of peripheral device and the frequency at which they communicate with the information handling system may be provided as part of this peripheral telemetry data. The method 500 may continue at block 508 with receiving, at the antenna controller, a usage persona descriptive of system operation and connection metrics from one or more wireless networks via the sideband serial messaging protocol and out-of-band (OOB) communications related to the plurality of operating wireless links. In an embodiment, this data may be obtained from a number of sensors including a proximity sensor and/or SAR detectors. In this embodiment, the power levels provided to the antennas of the information handling system may be compared to the data received by the proximity sensors to determine, for example, these SAR safety limitations as well as determine whether, for example, a user's body part or a peripheral device such as a stylus is absorbing this RF electromagnetic radiation. In an embodiment, this proximity data (e.g., SAR data) may be received via operation of a number of proximity sensors located at or near each of the antennas of the antenna systems described herein. Because the presence of a user's body part (e.g., a user's hand) may interfere with the transmission and reception of data, the antenna controller may use this data to determine which of the plurality of antennas should be operatively coupled to a RF subsystem operating under a prioritized wireless protocol. In reference to FIG. 3, for example, the antenna controller 340 may receive data from the proximity sensor hub 394 relating to the proximity of a user to antennas at relative locations on the information handling system.

The method 500 also includes, at block 510, receiving, at the antenna controller, a link persona from one or more wireless networks via the sideband serial messaging protocol and out-of-band (OOB) communications to the plurality of operating wireless links. The link persona indicates that the host Wi-Fi or the Wi-Fi RF subsystem is operating under very high data throughput (VHT) and a concurrent dual-band (CDB) mode. The VHT mode may be a result of the type of application being executed on the information handling system such as the audio-visual streaming application or online gaming application described herein both of which have a relatively higher transception of data across a network than, for example, an email application. The CDB (aka: simultaneous dual band), in relation to the operation of any antenna, may be the operation of those antennas at two separate networks or devices simultaneously using both 2.4- and 5-GHz frequency bands, for example. This, along with potentially doubling the available bandwidth, allows for more reliable network connections to be established. In an example embodiment, the link persona may include data describing that an audio/video streaming application is being executed that indicates that a relatively higher data transmission bandwidth low latency (avoid stalls) is necessary to properly execute that application in comparison to, for example, the execution of an email application. Similarly, an online gaming application may also be an example application that indicates that data transmissions may be high during execution and the system operation and connection metrics presented in the third column describing this usage context. Still further, in an embodiment, the link persona data may also include data describing latency, packet loss, network congestion, and prediction error either detectable at the radios of the information handling system or via the sideband communications establishing the OOB communication with an information handling system management system such as Dell Optimizer®. Still further, the link persona may also include data describing total available bandwidth on any given network. Again, this data may be provided via the sideband communications establishing the OOB communication with an information handling system management system and may describe what network slices are provided for the various data transmission (e.g., audio data, video data, web traffic, email data, and file transfer data).

The method also includes, at block 512, executing, with a processor, an antenna selection algorithm to use, as input, the peripheral telemetry data, the system operation and connection metrics, and the configuration data to output a connectivity resource mapping (e.g., Table 1) used to assign the plurality of antennas to be communicatively coupled to the one or more peripheral devices and plurality of operating wireless links. In one embodiment, the antenna selection algorithm may input detected link persona, wireless ecosystem persona, system configuration persona, and usage persona and other data into an artificial neural network, Bayesian network, decision trees, regression analysis, or other machine learning service algorithms that may be used to model the output within which the information handling system operates via classifiers to correlate antenna assignments (or setup) as an output and provide a closed loop system that can dynamically distribute and optimize resources (e.g., RF subsystems 130-1, 130-2, 130-3 and antennas 148, 150, 152, 154, 156, 158, FIG. 1) by providing feedback or output to optimize the connectivity of the information handling system and its plural antennas and RF subsystems to the various wireless networks. In an embodiment, the antenna selection algorithm applies a machine learning methodology to determine correlations of the influencing factors including the link persona, the wireless ecosystem persona, the system configuration persona, usage persona, and other persona metrics in embodiments described herein and detect changes to any of these influencing factors to suggest or automatically apply changes to a mapping and the assignment of any of the antennas to any of the RF subsystems. In some aspects, suggested predictive adjustments or notice of automatic predictive adjustments may be confirmed or declined by the user. In an embodiment, the suggested adjustments may be provided to the antenna controller. Based on these selected adjustments, the antenna controller may send signals to the RF to cause the suggested assignments of the antennas to the suggested RF subsystems in order to increase the optimized use of the transceiving antennas while the information handling system operates within the detected persona.

In some embodiments, the antenna selection algorithm may include or use, in whole or in part, a look-up table. This look-up table may include a number of triggers that may be used to define the peripheral telemetry data, the system operation and connection metrics, and configuration data. The look-up table may also include an antenna assignment as output based on the peripheral telemetry data, the system operation and connection metrics, and configuration data as described. In an embodiment, where the information handling includes six antennas, such a look-up table may look like Table 1 as described in connection with FIG. 1. The embedded controller or microcontroller unit (e.g., antenna controller) executing the antenna selection algorithm may correlate detected data of link persona, the wireless ecosystem persona, the system configuration persona, usage persona with a scenario from the table (e.g., Table 1) to determine antenna assignments. In some embodiments, the antenna selection algorithm may use a machine learning classifier to assist with correlation to table entries for scenario identification.

Based on the outputs due to the execution of the antenna selection algorithm by the antenna controller, the antenna controller may, at block 514, switch between operating transceiving antennas by accessing one or more RF switches to dynamically change the assignment of the plurality of antennas to the or more peripheral devices and plurality of operating wireless links. The operations of this switching, in some examples, is depicted in Table 1. For table 1, the antenna controller may select among four WLAN antennas and two WWAN antennas in order to dynamically change the assignment of the plurality of antennas to the or more peripheral devices and plurality of operating wireless links.

The method 500 may continue at block 516 with determining whether the link persona, the wireless ecosystem persona, the system configuration persona, usage persona have changed. Because this data is provided to the antenna controller in a closed-loop fashion, the antenna controller may periodically poll this data. Changes to this data may be detected when the antenna controller detects a change in any of the usage persona data, the wireless ecosystem persona data, the link persona data, or system configuration persona data described in FIG. 4. This may cause the antenna controller to again pull the link persona, the wireless ecosystem persona, the system configuration persona, usage persona at blocks 504 through 510, executing the antenna selection algorithm at block 510, and, when necessary, changing the assignment of the plurality of antennas to the or more peripheral devices and plurality of operating wireless links. Where this data is stable at block 516 and where it is determined at block 518 that either wireless functions or the information handling system is turned off, the method 500 may end. Otherwise, the information handling system may continue to monitor for selection among switched antennas depending on changes in the link persona, the wireless ecosystem persona, the system configuration persona, usage persona, or other factors as discussed in some embodiments.

The blocks of the flow diagrams of FIG. 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system comprising:
   a processor;
   a memory;
   a power management unit (PMU);
   a wireless interface adapter for communicating, via a plurality of transceiving antennas operated by one or more radio frequency (RF) subsystems on a plurality of operating wireless links;
   an antenna controller to receive:
      a wireless ecosystem persona describing peripheral telemetry data from a RF subsystem operatively coupling one or more peripheral devices to the information handling system, the peripheral telemetry data descriptive of the connectivity requirements for the one or more peripheral devices;
      a link persona describing data transmission requirements between the information handling system and a network;
      a usage persona describing system operation and connection metrics from one or more wireless networks via a sideband serial messaging protocol and out-of-band (OOB) communications related to the plurality of operating wireless links; and
      a system configuration persona describing configuration data descriptive of a configuration of the information handling system;
   the antenna controller to execute an antenna selection algorithm to use, as input, the wireless ecosystem persona, the link persona, the system configuration persona, and the usage persona to output a connectivity resource mapping used to assign the plurality of transceiving antennas to be communicatively coupled to the one or more peripheral devices and plurality of operating wireless links; and
   the antenna controller to switch between operating transceiving antennas by accessing one or more radio frequency (RF) switches to dynamically change the assignment of the plurality of transceiving antennas to the or more peripheral devices and plurality of operating wireless links.

2. The information handling system of claim 1 further comprising:
   the antenna controller to signal each RF switch to selectively switch from a first transceiving antenna to a second transceiving antenna based on the wireless ecosystem persona, link persona, usage persona, and system configuration persona.

3. The information handling system of claim 1 further comprising:
   the one or more RF switches operatively coupling a plurality of RF subsystems and a plurality of transceiving antennas;
   wherein the RF switches include two triple pole, double throw (TPDT) switches and a double pole, double throw (DPDT) switch to selectively switch the plurality of transceiving antennas between the plurality of RF subsystems.

4. The information handling system of claim 1 further comprising:
the connectivity requirements of the peripheral telemetry data of the wireless ecosystem persona including the frequency used to communicate with the one or more peripheral devices; and
the wireless ecosystem persona including an application being executed on the information handling system.

5. The information handling system of claim 1 further comprising:
the antenna selection algorithm includes a look-up table to be used to cross-reference the peripheral telemetry data, the system operation and connection metrics, and the configuration data along with proximity data descriptive of a user's body close to any of the plurality of transceiving antennas; and
to provide, as output, an identification of which among the plurality of transceiving antennas are to be assigned to the or more peripheral devices and plurality of operating wireless links.

6. The information handling system of claim 1 further comprising:
the sideband serial messaging protocol including the excitation of one of the plurality of transceiving antennas at one of the plurality of operating wireless links to determine wireless connection metrics received from a plurality of wireless networks via a remote information handling system management system a plurality of wireless connections available to the information handling system.

7. The information handling system of claim 1 further comprising:
the plurality of transceiving antennas including a pair of wireless local area network (WLAN) antennas and four wireless wide area network (WWAN) antennas, and
wherein at least one of the four WWAN antennas is operatively switched to operate as a WLAN antenna.

8. A method implemented at an information handling system comprising:
initiating, via a wireless interface adapter of the information handling system, a sideband communication via a wireless link to obtain data of a plurality of operating wireless links for a plurality of transceiving antennas on the information handling system from a remote information handling system management system;
receiving, at an antenna controller operatively coupled to the wireless interface adapter:
a wireless ecosystem persona describing peripheral telemetry data from a RF subsystem operatively coupling one or more peripheral devices to the information handling system, the peripheral telemetry data descriptive of the connectivity requirements for the one or more peripheral devices;
a link persona describing data transmission requirements between the information handling system and a network;
a usage persona describing system operation and connection metrics from one or more wireless networks via a sideband serial messaging protocol and out-of-band (OOB) communications to the plurality of operating wireless links;
a system configuration persona describing configuration data descriptive of a configuration of the information handling system;
executing, with a processor, an antenna selection algorithm to use, as input, the wireless ecosystem persona, the link persona, the system configuration persona, and the usage persona to output a connectivity resource mapping used to assign the plurality of transceiving antennas to be communicatively coupled to the one or more peripheral devices and plurality of operating wireless links; and
with the antenna controller, switching between operating transceiving antennas by accessing one or more radio frequency (RF) switches to dynamically change the assignment of the plurality of transceiving antennas to the or more peripheral devices and plurality of operating wireless links.

9. The method implemented at an information handling system of claim 8 further comprising:
signaling each RF switch to selectively switch from a first transceiving antenna to a second transceiving antenna based on the wireless ecosystem persona, link persona, usage persona, and system configuration persona.

10. The method implemented at an information handling system of claim 8 further comprising:
providing the wireless ecosystem persona, the link persona, the system configuration persona, and the usage persona as input into a machine learning classifier modeling correlations and outputs the connectivity resource mapping used to assign the plurality of transceiving antennas to be communicatively coupled to the one or more peripheral devices and plurality of operating wireless links.

11. The method implemented at an information handling system of claim 8 further comprising:
the connectivity requirements of the peripheral telemetry data including the frequency used to communicate with the one or more peripheral devices and the input used by an application being executed on the information handling system.

12. The method implemented at an information handling system of claim 8 further comprising:
the antenna selection algorithm makes a correlation to the wireless ecosystem persona, the link persona, the system configuration persona, and the usage persona at a look-up table with one of a plurality of scenarios presented in the look-up table to identify the wireless connectivity needed for the inputs; and
provide, as output, an identified connectivity resource mapping.

13. The method implemented at an information handling system of claim 8 further comprising:
the sideband communication including the execution of a serial messaging protocol to excite one of the plurality of transceiving antennas at one of the plurality of operating wireless links via an out-of-band communication to determine wireless connection metrics received from a plurality of wireless networks via a remote information handling system management system defining a plurality of wireless connections available to the information handling system.

14. The method implemented at an information handling system of claim 8 further comprising:
the plurality of transceiving antennas including a pair of wireless local area network (WLAN) antennas and four wireless wide area network (WWAN) antennas, and
wherein at least one of the four WWAN antennas is operatively switched to operate as a WLAN antenna.

15. A wireless interface adapter for an information handling system comprising:

a plurality of transceiving antennas operated by one or more radio frequency (RF) subsystems, a plurality of operating wireless links;

an antenna controller to receive:
- a wireless ecosystem persona describing peripheral telemetry data from a RF subsystem operatively coupling one or more peripheral devices to the information handling system, the peripheral telemetry data descriptive of the connectivity requirements for the one or more peripheral devices;
- a link persona describing data transmission requirements between the information handling system and a network via a sideband serial messaging protocol and out-of-band (OOB) communications related to the plurality of operating wireless links;
- a usage persona describing system operation and connection metrics from one or more wireless networks via the sideband serial messaging protocol and out-of-band (OOB) communications related to the plurality of operating wireless links;
- a system configuration persona describing configuration data descriptive of a configuration of the information handling system;

the antenna controller to execute an antenna selection algorithm to use, as input, the wireless ecosystem persona, the link persona, the system configuration persona, and the usage persona to output a connectivity resource mapping used to assign the plurality of transceiving antennas to be communicatively coupled to the one or more peripheral devices and plurality of operating wireless links; and the antenna controller to switch between operating transceiving antennas by accessing one or more radio frequency (RF) switches to dynamically change the assignment of the plurality of transceiving antennas to the or more peripheral devices and plurality of operating wireless links.

16. The wireless interface adapter of claim 15 further comprising:
the antenna controller to signal each RF switch to selectively switch from a first transceiving antenna to a second transceiving antenna based on the wireless ecosystem persona, link persona, usage persona, and system configuration persona.

17. The wireless interface adapter of claim 15 further comprising:
the one or more RF switches operatively coupling a plurality of RF subsystems and a plurality of transceiving antennas;
wherein the RF switches include two triple pole, double throw (TPDT) switches and a double pole, double throw (DPDT) switch to selectively switch the plurality of transceiving antennas between the plurality of RF subsystems.

18. The wireless interface adapter of claim 15 further comprising:
the connectivity requirements of the peripheral telemetry data of the wireless ecosystem persona including the frequency used to communicate with the one or more peripheral devices; and
the wireless ecosystem persona including an application being executed on the information handling system.

19. The wireless interface adapter of claim 15, further comprising:
the antenna selection algorithm includes a look-up table to be used to cross-reference the peripheral telemetry data, the system operation and connection metrics, and the configuration data along with proximity data descriptive of a user's body close to any of the plurality of transceiving antennas; and
to provide, as output, an identification of which among the plurality of transceiving antennas are to be assigned to the or more peripheral devices and plurality of operating wireless links.

20. The wireless interface adapter of claim 15, further comprising:
the sideband communication including the execution of a serial messaging protocol to excite one of the plurality of transceiving antennas at one of the plurality of operating wireless links via an out-of-band communication to determine wireless connection metrics received from a plurality of wireless networks via a remote information handling system management system defining a plurality of wireless connections available to the information handling system.

* * * * *